United States Patent
Trudeau

(10) Patent No.: US 10,539,399 B2
(45) Date of Patent: Jan. 21, 2020

(54) PROJECTILE PENETRATION RESISTANCE ASSEMBLIES

(71) Applicant: David Anthony Trudeau, Grayslake, IL (US)

(72) Inventor: David Anthony Trudeau, Grayslake, IL (US)

(73) Assignee: Truarmor a Division of Clear-Armor, LLC, Grayslake, IL (US)

( * ) Notice: Subject to any disclaimer, the term of this patent is extended or adjusted under 35 U.S.C. 154(b) by 0 days.

(21) Appl. No.: 15/824,590

(22) Filed: Nov. 28, 2017

(65) Prior Publication Data

US 2018/0156578 A1    Jun. 7, 2018

Related U.S. Application Data

(60) Provisional application No. 62/455,118, filed on Feb. 6, 2017, provisional application No. 62/426,694, filed on Nov. 28, 2016.

(51) Int. Cl.
*F41H 5/04* (2006.01)
*F41H 5/26* (2006.01)
*F41H 7/00* (2006.01)

(52) U.S. Cl.
CPC ........... *F41H 5/0407* (2013.01); *F41H 5/263* (2013.01); *F41H 7/00* (2013.01)

(58) Field of Classification Search
CPC ........... F41H 5/0407; F41H 5/263; F41H 7/00
See application file for complete search history.

(56) References Cited

U.S. PATENT DOCUMENTS

| | | | |
|---|---|---|---|
| 3,930,452 A * | 1/1976 | Van Laethem | ... B32B 17/10045 109/80 |
| 4,055,031 A | 10/1977 | Okawa et al. | |
| 4,336,644 A * | 6/1982 | Medlin | ..................... B60P 3/03 29/401.1 |
| 4,952,459 A * | 8/1990 | Thatcher | ........... B32B 17/10018 428/212 |
| 5,271,311 A | 12/1993 | Madden, Jr. | |
| 5,368,904 A * | 11/1994 | Stephinson | ....... B32B 17/10018 428/213 |
| 5,567,529 A | 10/1996 | Smith | |
| 5,594,193 A | 1/1997 | Sheridan | |
| 5,747,159 A | 5/1998 | Labock | |
| 5,811,719 A * | 9/1998 | Madden, Jr. | ............ B60R 21/12 296/146.7 |
| 5,857,730 A | 1/1999 | Korpi et al. | |

(Continued)

FOREIGN PATENT DOCUMENTS

CN    2247098 Y    2/1997
DE    10002449 A1    8/2001

OTHER PUBLICATIONS

"One-Way Ballistic Glass", Total Security Solutions, www.tssbulletproof.com, Sep. 26, 2011 (Year: 2011).*

(Continued)

*Primary Examiner* — Joshua T Semick
(74) *Attorney, Agent, or Firm* — Boyle Fredrickson S.C.

(57) ABSTRACT

Unidirectional transparent projectile penetration resistant panels and bidirectional opaque projectile penetration resistant assemblies and systems and methods of forming and mounting the same relative to underlying support structures.

20 Claims, 39 Drawing Sheets

(56) References Cited

U.S. PATENT DOCUMENTS

| | | | |
|---|---|---|---|
| 5,908,674 A * | 6/1999 | Schindler | B32B 17/10018 |
| | | | 428/34 |
| 6,027,158 A | 2/2000 | Yang | |
| 6,280,826 B1 | 8/2001 | Woll et al. | |
| 6,546,692 B1 * | 4/2003 | Duncan | B32B 17/10018 |
| | | | 52/786.11 |
| 6,818,268 B2 * | 11/2004 | Gonzalez | F41H 5/263 |
| | | | 296/96.14 |
| 7,063,374 B1 | 6/2006 | Cameron | |
| 7,114,760 B2 | 10/2006 | Cameron | |
| 7,318,956 B2 * | 1/2008 | Labock | B32B 7/12 |
| | | | 428/212 |
| 7,854,466 B2 | 12/2010 | Blackmer et al. | |
| 8,088,426 B2 * | 1/2012 | Hofmann | A23C 19/0921 |
| | | | 426/533 |
| 8,088,462 B1 * | 1/2012 | Cockman | F41H 5/0407 |
| | | | 150/166 |
| 8,281,550 B1 * | 10/2012 | Bolton | C09K 21/10 |
| | | | 428/921 |
| 9,091,510 B2 * | 7/2015 | Carberry | B32B 17/10036 |
| 9,500,445 B2 * | 11/2016 | Hsieh | F41H 5/0478 |
| 2008/0063819 A1 * | 3/2008 | Monroe | B32B 17/06 |
| | | | 428/34 |
| 2008/0129084 A1 | 6/2008 | Blackmer et al. | |
| 2009/0139091 A1 | 6/2009 | Tucker et al. | |
| 2009/0263651 A1 | 10/2009 | Cook | |
| 2011/0072961 A1 * | 3/2011 | Jungkuist | E06B 3/6621 |
| | | | 89/36.02 |
| 2011/0308381 A1 * | 12/2011 | Hartley | F41H 5/0407 |
| | | | 89/36.02 |
| 2012/0180638 A1 * | 7/2012 | Hubert | F41H 5/0407 |
| | | | 89/36.08 |
| 2012/0207966 A1 | 8/2012 | Dickson | |
| 2013/0171398 A1 | 7/2013 | Stranner | |
| 2014/0260937 A1 | 9/2014 | Whitaker | |
| 2014/0326126 A1 * | 11/2014 | Hay, III | E06B 3/24 |
| | | | 89/36.04 |
| 2015/0260483 A1 | 9/2015 | Wibby et al. | |
| 2015/0285595 A1 * | 10/2015 | Auchter-Krummel | |
| | | | F41H 5/0407 |
| | | | 428/46 |
| 2016/0187107 A1 | 6/2016 | Johnston et al. | |
| 2018/0087877 A1 * | 3/2018 | Carton | F41H 5/007 |

OTHER PUBLICATIONS

"OneWay Bullet Resistant Glass", Regev Maimon, www.youtube.com, Jul. 21, 2009 (Year: 2009).*

"Compressive Strength Testing of Plastics"; http://www.matweb.com/reference/compressivestrength.aspx (Year: 2007).*

Bos, Freek; Louter, Christian; Veer, Fred; "Challenging Glass: Conference on Architectural and Structural Applications of Glass; Faculty of Architecture, Delft University of Technology"; May 2008; ISBN 9781586038663, p. 148 (Year: 2008).*

PCT International Search Report for PCT/US2017/063496 dated Apr. 13, 2018.

PCT International Search Report for PCT/US2017/063503 dated Jun. 25, 2018.

* cited by examiner

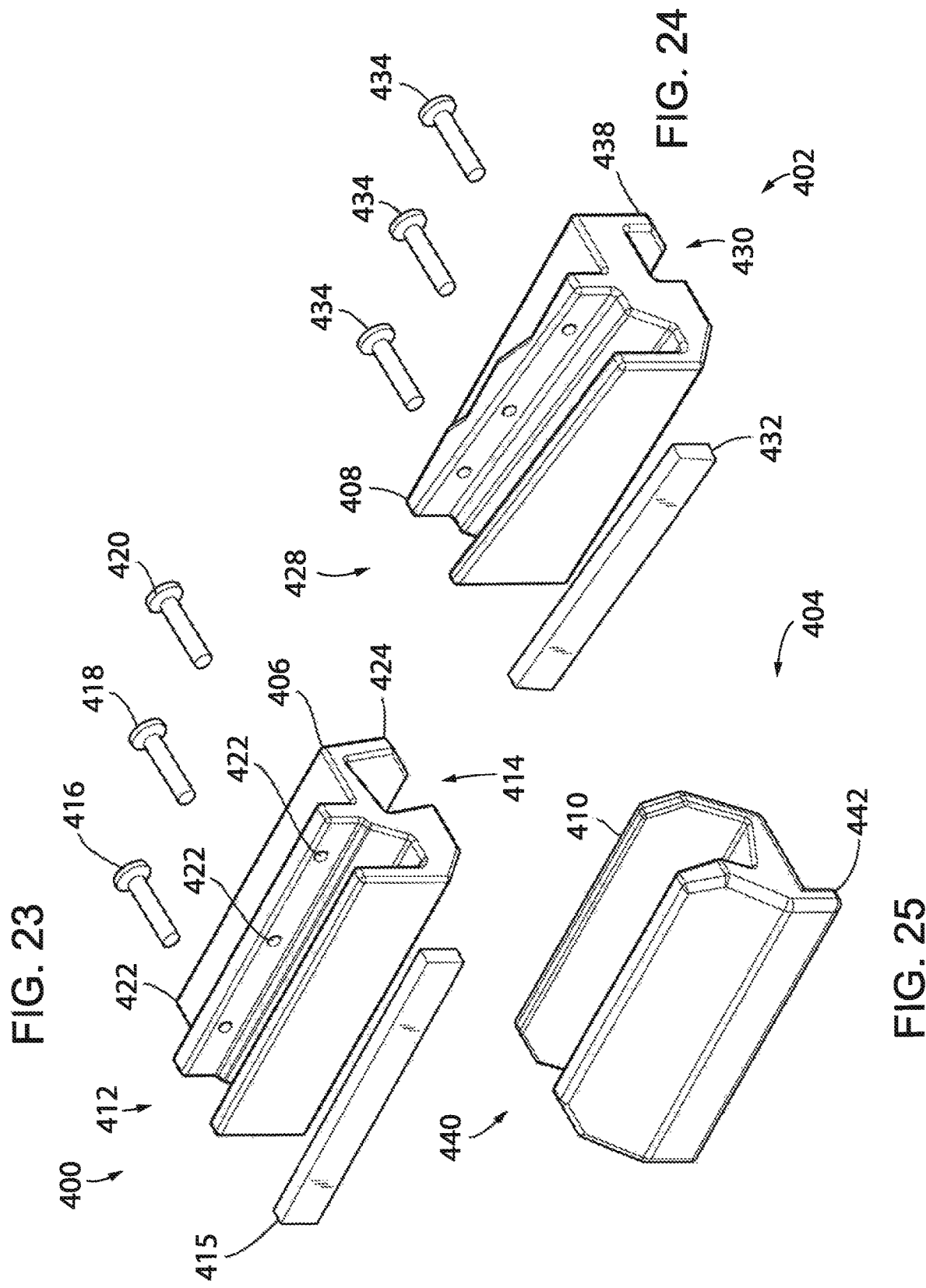

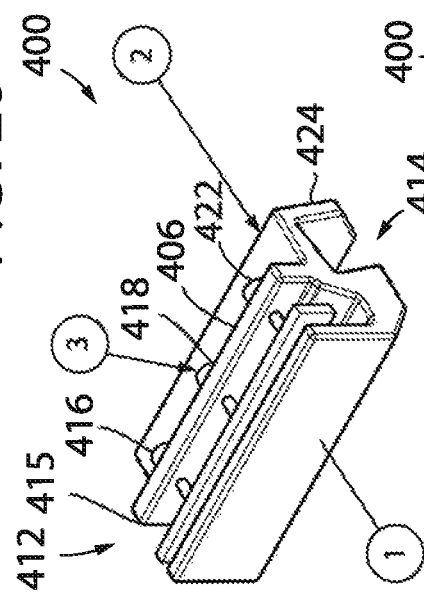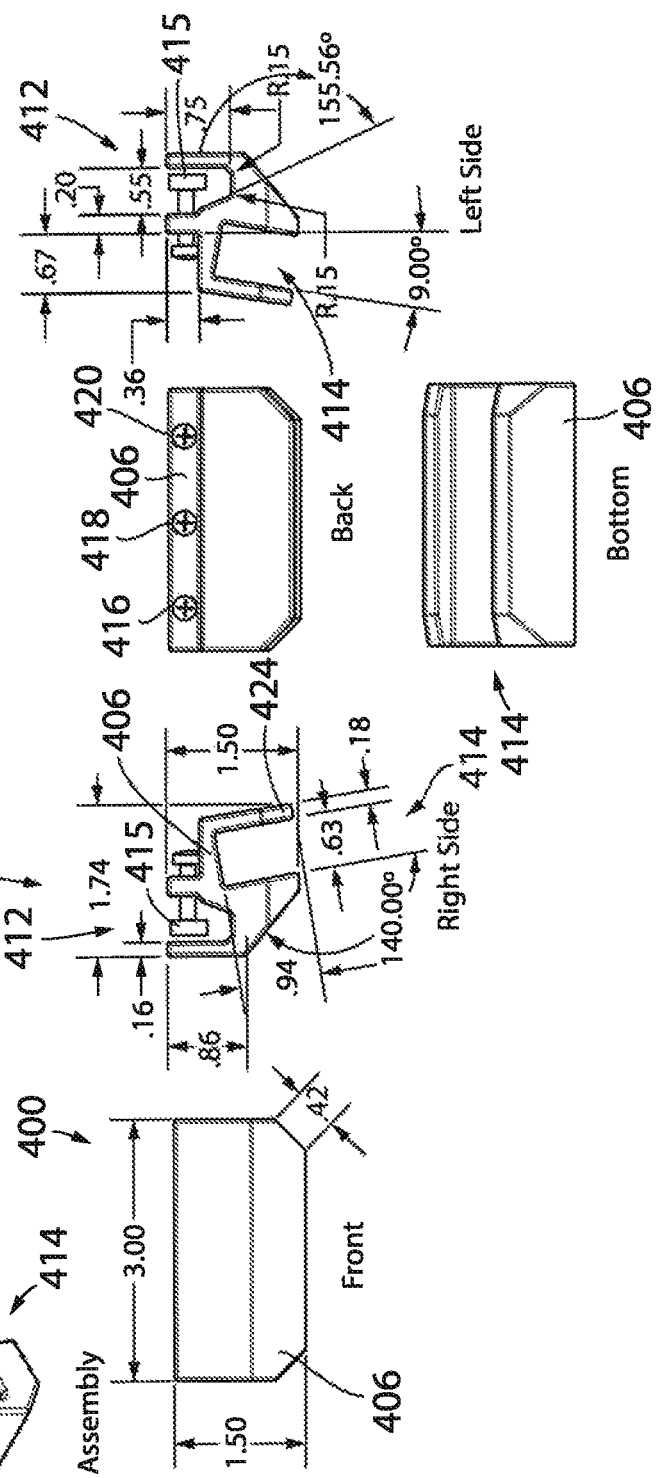

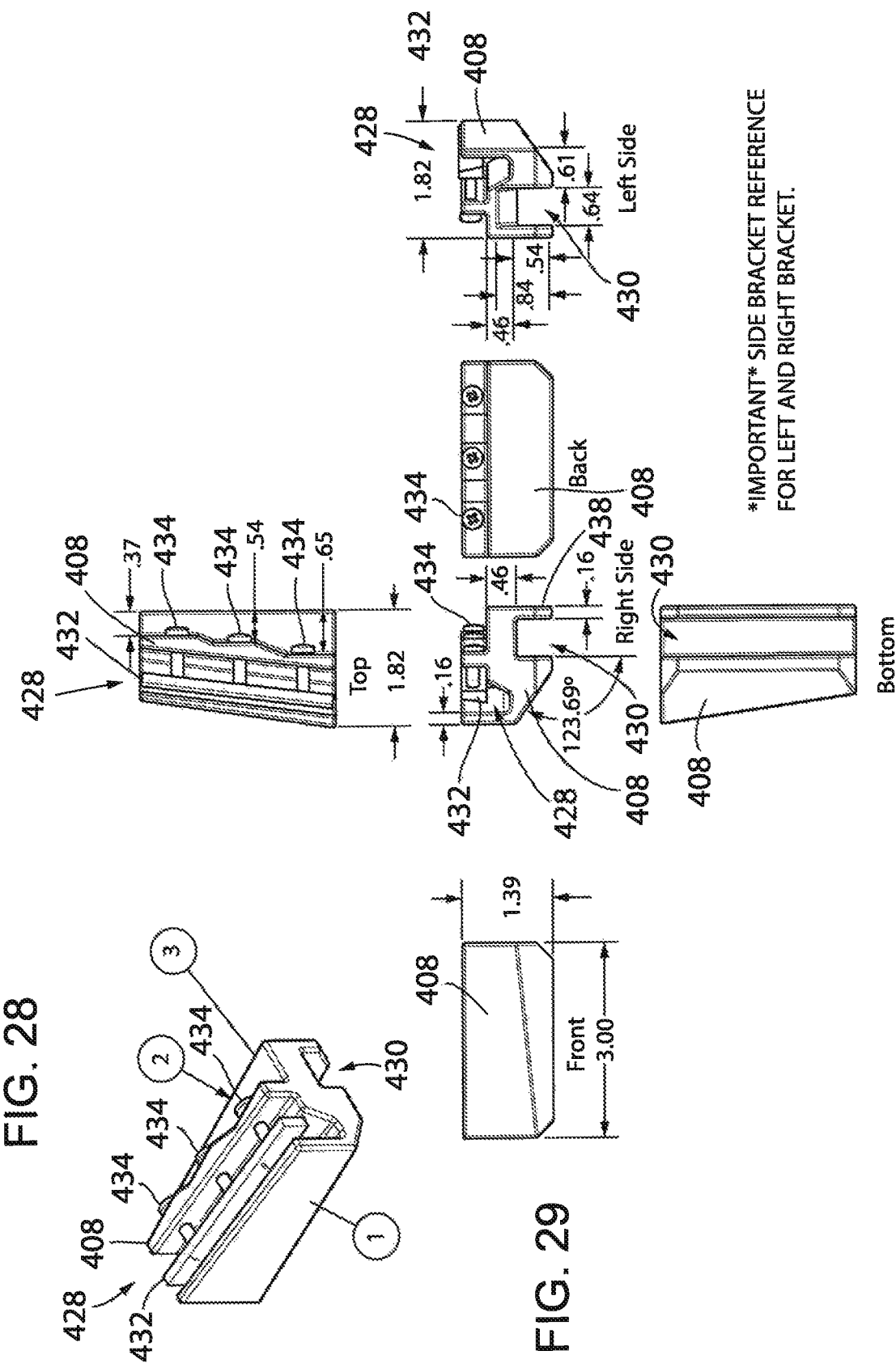

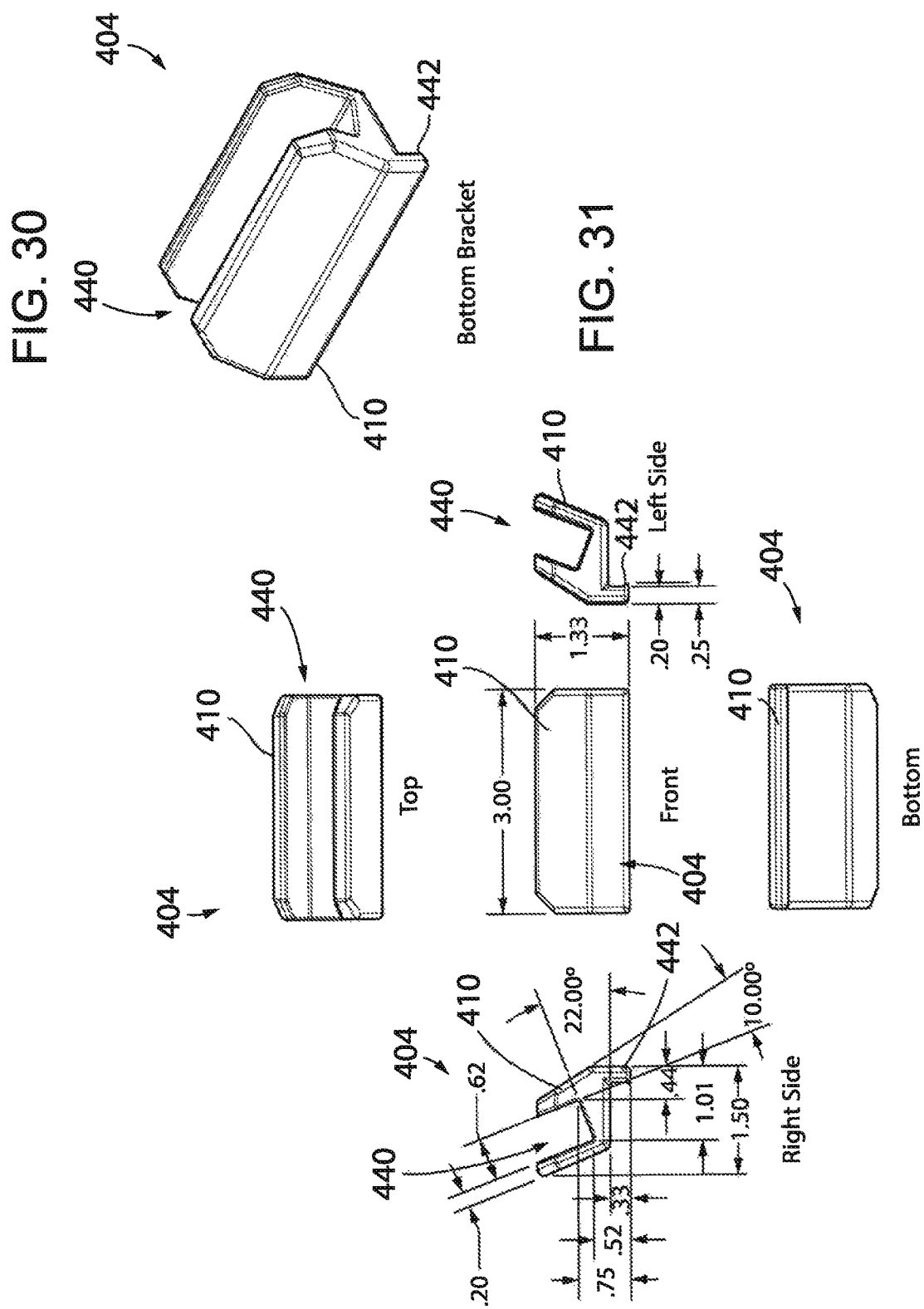

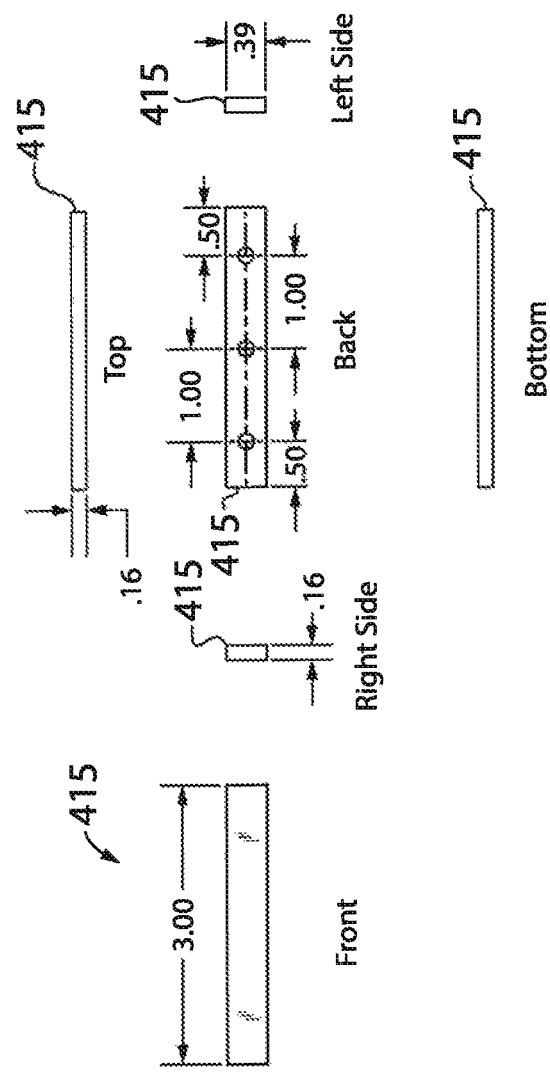
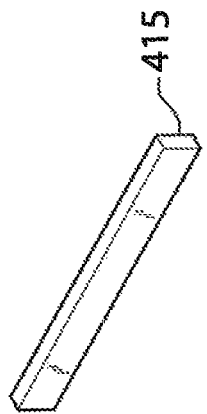
FIG. 32
FIG. 33

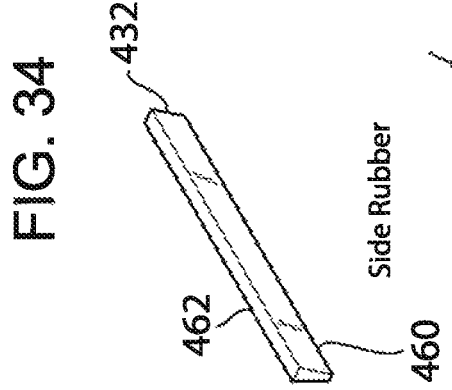
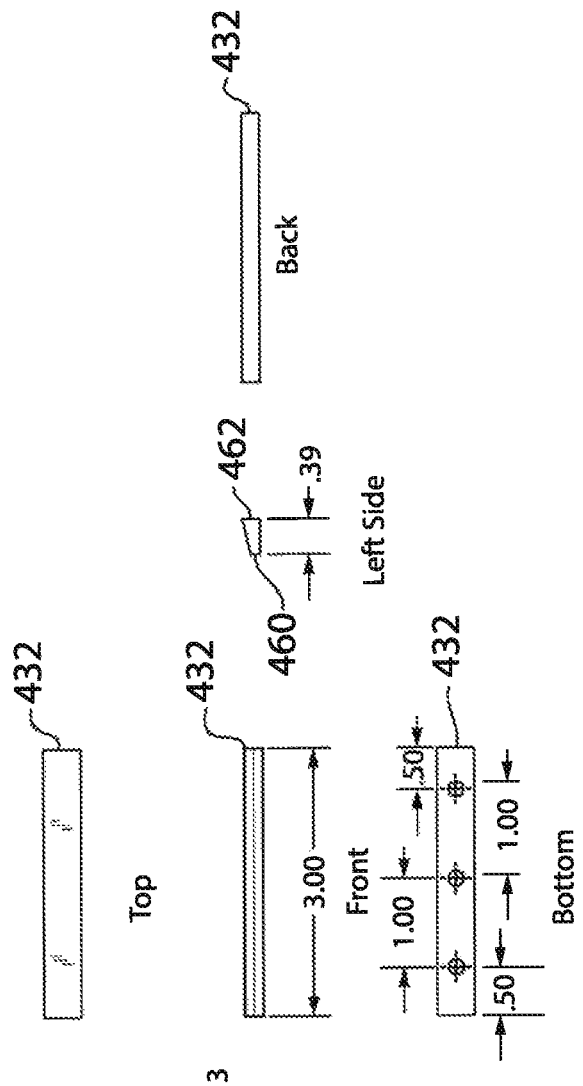

PROJECTILE PENETRATION RESISTANCE ASSEMBLIES

CROSS REFERENCE TO RELATED PATENT APPLICATIONS

This application claims priority to U.S. Provisional Patent Application Ser. No. 62/426,694 filed on Nov. 28, 2016 titled "Uni-Directional Projectile Resistant Assembly" and claims priority to U.S. Provisional Patent Application Ser. No. 62/455,118 filed on Feb. 6, 2017 titled "Projectile Penetration Resistance Assemblies", the disclosures of each of which are hereby expressly incorporated herein.

BACKGROUND OF THE INVENTION

Penetration resistance is a property that is desired in various environments and in various applications. Examples of such applications include providing structures that can withstand storm debris impacts, personal and vehicle armaments, etc. Understandably, the degree and nature of the penetration resistance performance is largely related to the use and construction of the underlying structure or vehicle as well as the ability of the structure, vehicle, or person to withstand the weight and forces associated with other considers related to movability and/or the underlying operation of the structures and/or vehicles with which they are supported and providing the desired degree of penetration resistance.

With respect to storm proofing applications, others provide window and door assemblies that are constructed to provide variable degrees of debris or projectile impact resistance. Unfortunately, such approaches are not without their respective drawbacks. For instance, storm proofing existing structures and/or the glass panel assemblies associated with windows and doors common thereto generally requires replacement of the entire window and door units as a whole. Such an approach requires consideration of building codes and building esthetics so as to maintain an unobtrusive presentation of the penetration resistant structures. Such an approach substantially increases new building construction and is generally cost prohibitive from a remodeling perspective.

Further, with respect to configuring existing structures to provide penetration resistance, the existing underlying structures associated with supporting the respective doors and windows are generally ill-suited to withstand the additional loading associated with replacement of such structures. That is, storm proof windows and doors are generally substantially heavier than traditional window and door frame assemblies. Such considerations are more problematic in multi-floored structures and/or structures having floor-to-ceiling window and/or door panels wherein the underlying structural framing is ill-suited to withstand the addition forces associated with penetration resistant window and door panels and the weight and forces customary thereto. Accordingly, a first aspect of the present invention is directed to providing projectile penetration resistance to existing window and/or door structures and particularly, the transparent portions thereof.

It is appreciated that providing penetration resistance to transparent structures as discussed above has applications beyond building structures. For instance, it should be appreciated that penetration resistance would be advantageous to many vehicle applications. For instance, it is commonly appreciated that security vehicles such as bank transport vehicles and/or armored vehicles and/or vehicles uniquely configured for police, security, and military applications must be uniquely configured to support penetration or bulletproofing. Personal vehicles are also occasionally equipped with such armaments but usually only at such great expense that only the extremely wealthy or otherwise potentially political and/or famous public figures can afford such protections.

Some considerations associated with any vehicle armament are generally related to the construction of the underlying vehicle such that vehicle armament must be communicated to vehicle manufacturers such that the resultant vehicle can be designed and constructed to withstand the additional loading associated with such armaments. Such considerations generally include vehicle door frame hinge assemblies, vehicle chassis considerations, suspension features, and engine and vehicle transmission requirements as known armaments substantially effect the underlying performance of such components due to their weight and customary considerations associated with their intended support relative to the underlying vehicle.

That is, providing original equipment manufacturer's (OEM's) vehicles in an armored configuration customarily requires consideration during the design and build of the underlying vehicle to be able to withstand and/or otherwise support the armaments associated therewith. Such considerations are not limited to the glass portions of the underlying vehicle but also relate to other vehicle panel assemblies which are not otherwise commonly configured to be projectile resistant. Although steel plating is a common approach for the non-transparent structures of the underlying vehicle portions, such an approach substantially increases the weight of the underlying vehicle and the considerations attentive thereto as discussed above. Accordingly, another aspect of the present invention is directed to providing opaque and/or transparent penetration resistance assemblies which do not unduly interfere with considerations associated with the formation of the underlying vehicle.

In addition to the weight considerations discussed above, another consideration is directed to the capability or desire of users positioned in respective armored or protective vehicles to be able to return fire or otherwise neutralize threats external to the vehicle. Commonly, vehicle armaments provide bidirectional penetration resistance wherein projectiles cannot pass through the projectile resistance treatments in either direction. Such considerations render customary penetration resistance configurations unsuitable for many applications wherein persons disposed within a vehicle may be better served by being able to return fire or otherwise defend themselves with respect to acts of aggression directed toward the persons contained in the underlying vehicle.

Still further consideration with respect to penetration resistance or bulletproofing assemblies relates to personal armaments such as chest, back, or body plating and/or apparel. Such assemblies are customarily configured to accommodate desired degrees of movement of the underlying wearer and commonly sacrifice penetration resistance in favor of the weight borne by the user as well as maintaining the desired degree of freedom of physical motion for the wearer. Such assemblies cannot be unduly cumbersome and such assemblies must provide dissipation of the projectile energy to a larger surface area of the wearer's body so as to prevent impact injuries rather than penetration injuries attentive thereto.

Although some such forms of personal physical armaments are provided in flexible garments associated with containing respective discrete penetration resistant panels, such assemblies commonly provide unprotected areas between the discrete panels which facilitate the flexible movement of the respective supporting garment associated therewith. As such, such assemblies present the opportunity for projectile penetrations for those areas that do not include or otherwise present the seam edges between discrete penetration resistant panels. Such panels are commonly provided in a conveniently replaceable configuration but are generally flat and cannot otherwise be contoured to the underlying anatomy associated with the wearer. Additionally, such personal physical armaments and/or apparel are generally heavy thereby limiting the duration with which a person can function while wearing such armaments and requires a degree of fitness uncommon to much of the populous including youth.

Therefore, there are needs for projectile penetration resistance assemblies that can be either transparent and/or opaque depending upon the intended application, are substantially lighter weight than known penetration resistance assemblies, can be supported and/or integrated into existing and/or original equipment manufacturers equipment, and do not unduly interfere with the desired range of motion or customary operation associated with the discrete features and/or pre-existing construction of the underlying structure or facility, vehicle, and/or anatomy of a wearer, and, depending upon the intended application, can provide bidirectional or unidirectional penetration resistance performance.

SUMMARY OF THE INVENTION

The present invention relates to materials, implementations, and methods of manufacturing penetration resistant materials the support or mounting structures associated with securing the resultant material relative to a support structure and which is resistant to penetration via high energy projectiles such as bullets or the like.

In accordance with one embodiment of the invention, a projectile resistant assembly designed to resist movement of a projectile in one direction while allowing movement of the projectile in another direction includes at least one window and a gasket. Each window includes a glass layer having a first side and a second side, a blowback sheet is applied to the first side of the glass layer, a binder coat is applied to the second side of the glass layer, a resistant layer applied to the binder coat, and a top coat is applied to the resistant layer. In a preferred embodiment, the gasket has a plurality of walls that extend upwardly from a bottom wall and at least one slot disposed between adjacent walls of the plurality of walls. At least one treated window is disposed within each respective slot defined by the gasket.

In accordance with another embodiment of the invention, a kit is disclosed for treating installed or placed sheets or panes of glass to improve the impact and penetration resistance of the glass. Depending on the application associated with use of the glass materials—i.e. a residential or commercial building window or partition, or a window of a car, the kit can include one or more brackets that are configured to mount projectile resistance treated glass panes or panels relative to an underlying structure, such as a car frame structure or adjacent building structures. Preferably, a gasket can be provided between each treated layer of glass and the respective mounting structure such as a respective bracket.

Each treated window includes a layer of glass having a first side and a second side. A blowback sheet or layer is applied to the first side of the glass layer and a binder coat layer is applied to the second side of the layer of glass. A resistant or resistance layer is applied to the binder coat and a top coat layer is applied to the resistant layer. When provided or when the glass pane or window is not otherwise supported by a vehicle or building structure, the gasket includes a plurality of walls that extend upwardly from a bottom wall such that one or more slots can be defined between adjacent walls of the gasket. Each slot is preferably configured to sealingly cooperate with a perimeter of a respective window pane or treated glass panel.

When provided, or necessary to support treated glass panels relative to an underlying structure, each bracket preferably includes a main body having a first end and a second end. A first arm and a second arm each extend in generally outward lateral directions relative to a first surface of the main body from a respective one of the first end and the second end of the main body. A receiving slot is disposed between the first arm and the second arm and configured to receive a treated glass pane or panel and an associated gasket. A third arm extends in a generally outward direction from a second surface of the main body proximate the second end of the main body and is configured to accommodate mechanical securing of the bracket, and any treated glass panels associated therewith, relative to a support structure such as an automobile or building frame structure.

Another aspect of the present invention is directed to providing a penetration resistant panel that is not transparent. The penetration resistant panel according to another aspect of the invention is opaque and formed as a lightweight laminate panel that is readily workable with customary wood and metal working tools such as circular or reciprocating saws, drilling tools, etc. The panel material is formed of a multiple layer of nylon reinforced fabric material wherein each layer of fabric material is adhered to one another with an adhesive. The multiple layered assembly of fabric material and adhesive is pressed into a desired shape and heated during pressing such that the discrete layers of the panel are rendered inseparable during normal working processes and during projectile impact events. The number of layers associated with formation of the panel material can be manipulated to provide a desired projectile penetration resistance.

Further, the workablility and lightweight nature of the panel material has shown the panel material being suitable for projectile resistance in a number of applications including automotive, furniture, apparel, and building applications. It is further appreciated that the flexibility associated with the manufacturing process, when considered in combination with the lightweight nature of the discrete panels facilitates formation of the panels in various contours including as panels suitable for wearing or integration with clothing articles or accessories, such as purses, backpacks, or the like to provide penetration resistant apparel that does not unduly interfere with or restrict motion of the wearer.

BRIEF DESCRIPTION OF THE DRAWINGS

A clear conception of the advantages and features constituting the present invention will become more readily apparent by referring to the exemplary, and therefore non-limiting, embodiments illustrated in the drawings accompanying and forming a part of this specification, wherein like reference numerals designate the same elements in the several views.

In the drawings:

FIGS. 23-35 show various views of mounting arrangements associated with securing transparent projectile penetration resistant materials relative to automotive structures such as a door of an automobile or other vehicle according to further aspects of the invention.

DETAILED DESCRIPTION

The present invention and the various features and advantageous details thereof are explained more fully with reference to the non-limiting embodiments described in detail in the following description.

Figure 1:
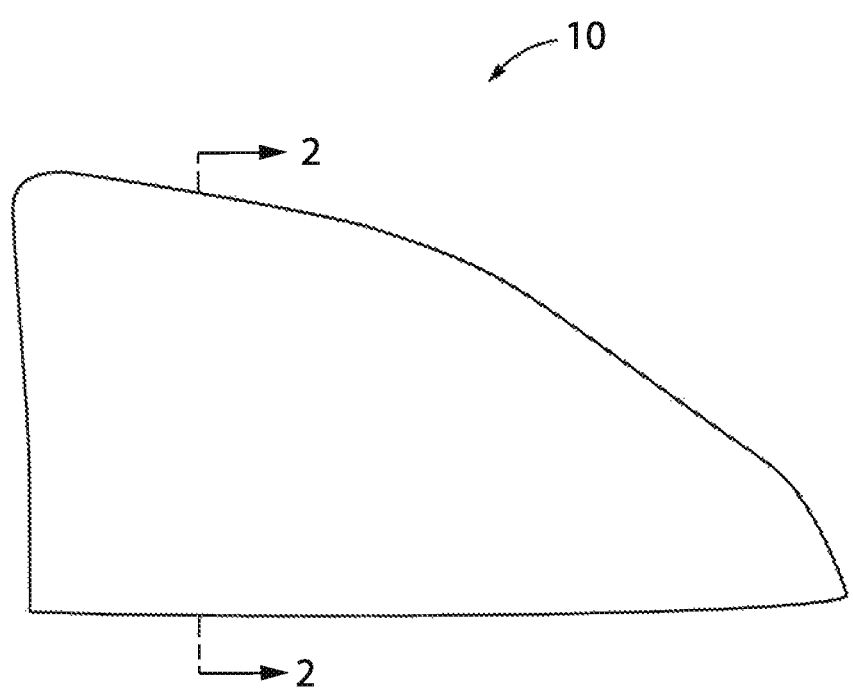
FIG. 1 is a side elevation view of a treated glass window or panel according to an embodiment of the invention and in the exemplary form factor of a vehicle door window.
Figure 2:
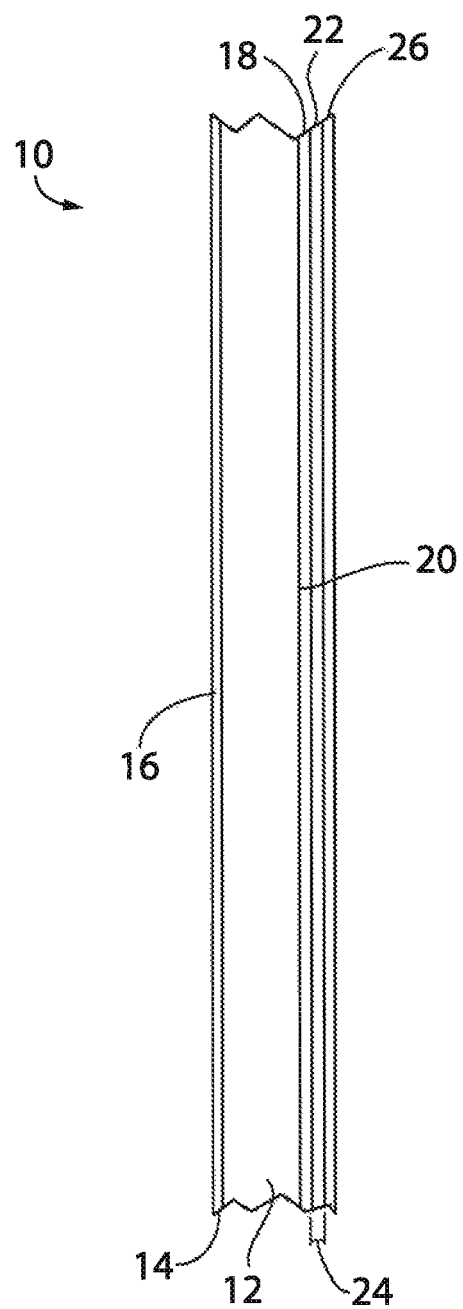
FIG. 2 is a cross-sectional view of a portion of the treated glass window shown in FIG. 1 taken along line 2-2.

FIGS. 1 and 2 show a treated glass pane or window 10 that has undergone a glass treatment process as disclosed herein is shown such that window 10 is rendered penetration resistant in one direction without substantially affecting the penetration resistance in an opposite direction. That is, treated glass window 10 is configured to resist passage of projectiles through the window in directions crossing the plane defined by the window pane in one direction and only minimally interfere with passage of projectiles in an opposite direction. Said in another way, once treated in the manner disclosed below, commercially available glass, whether provided in truly planar shapes (customary to building structures) or having a curved or otherwise non-planar or other contoured shaped (customary to automotive glass), whether tempered or non-tempered, annealed or non-heated treated, treated window 10 is provided with a substantial projectile or penetration resistance in one direction and negligible penetration resistance in the opposite direction as compared to untreated glass panes having similar mechanical properties. That is, treated glass pane 10 has appreciable unidirectional penetration or projectile resistance. It is further appreciated that the penetration resistance treatment disclosed further below can be effectuated prior to assembly of an underlying vehicle or provided to an already owned vehicle or building transparent structure.

Treated window pane 10 may be provided in virtually any shape. In one embodiment, treated window pane 10 is provided in the shape of a typical automotive window. While, the glass window 10 is depicted as a front side automobile window, it is also contemplated that the glass window 10 may be in virtually any form or shape of window. For example, the glass window 10 may be sized and shaped to cooperate with virtually any supporting structure, such as an automobile, home, commercial building, or other structure commonly having one or more windows.

FIG. 2 illustrates a cross-sectional view showing the multiple layers associated with treated glass window 10 to manipulate the penetration resistance of the underlying glass pane. First, treated glass window 10 includes a glass layer 12. According to the representative embodiment of the invention, the glass layer 12 may be an approximately ½ inch thick piece of annealed glass. However, it is contemplated that other combinations of thickness and styles of glass may be used including tempered and non-tempered glass panels or panes as are customarily commercially available in various building and automotive applications. It is further appreciated that glass layer 12 may be a treated or layered glass structure that is configured to resist chipping and/or cracking and otherwise configured to withstand stone impacts or the like. Some such exemplary glass assemblies include Corning® Gorilla® glass windshields which are formed as a three-layer laminate assembly formed by a layer of soda lime glass, an interstitial layer of a thermoplastic such as a polyvinyl film, and an opposing layer of an ion exchange formed glass material such as Corning® Gorilla® glass. Still another option associated with underlying panel include Corning® Willow® glass which exhibits various glass attributes but is provided in a flexible form-factor. Although such materials perform admirably for withstanding damage due to ordinary exposure to road or environment hazards such as hail or stones, even such modified glass panels are unable to withstand high energy robust projectile impacts such as firearm projectiles.

It is appreciated that glass layer 12 can be provided in various sizes, shapes, thicknesses, and of various materials having generally uniform material constructions or laminate material constructions. A blowback sheet 14 is applied to a first side 16 of the un-treated commercially available glass layer 14. While the representative embodiment of the invention uses a blowback sheet 14 comprising a triple-ply polyethylene terephthalate (PET) film, it is contemplated that the blowback sheet 14 may comprise a PET film having more or less than a triple-ply construction or another film other than PET.

FIG. 2 further illustrates the glass window 10 including a binder coat 18 applied to a second side 20 of the untreated glass layer 12. In one example of the invention, the binder coat 18 is a pressure sensitive adhesive layer. However, it is contemplated that the binder coat 18 may comprise other adhesives known in the art. The glass window 10 also includes a resistance or resistant layer 22 that is applied to or overlies the binder coat 18. A thickness 24 of the resistant layer 22 may vary depending on the type of projectile the glass window 10 is intended to resist. The glass window 10 further includes a scratch resistant top coat 26 applied to the resistant layer 22. The top coat 26 may comprise any material known in the art, for example, but not limited to, PET. As a result of the configuration of the untreated glass layer 12, blowback sheet 14, binder coat 18, resistant layer 22, and top coat 26, the glass window 10 is configured to resist passage of one or more projectiles through the treated glass window 10 in one direction, while allowing passage of the projectile through the glass window 10 in the other direction without noticeably detracting from the transparency or visibility of treated window pane 10 or substantially increasing the load bearing requirement associated with supporting treated window pane 10 relative to an underlying structure. When provided for automotive applications, it is further appreciated that the frit or black enamel band that commonly circumscribes at least the windshield can be disposed under the respective layers of the penetration resistance treatment or be configured to wrap the outward radially directed edge associated with the circumferential boundary of the treatment. Such a consideration mitigates the potential for delamination or separation of the respective layers of the treatment from the underlying glass panel from the radial perimeter edges thereof.

Fitting building structures with treated glass panes 10 can dramatically improve the penetration resistance of the glass panes in a direction from atmosphere toward the interior of the structure. Such a consideration renders buildings and autos better equipped to withstand the detrimental effects of adverse weather such as hurricanes, tornadoes, or the like, and the airborne debris associated therewith. Similarly, such considerations mitigate the detrimental effects of antagonistic or terroristic activities by preventing projectiles or shrapnel from arms fire or improvised explosive devices from penetrating the treated glass panes 10. In a preferred embodiment, testing has shown that treated glass panes 10 can withstand and prevent penetration of multiple rounds of projectiles originating from firearms including pistols as well as rifles.

The unidirectional projectile penetration resistance performance of treated glass panes 10 further allows persons associated with the penetration allowing direction side of the respective treated glass panes 10 to degrade discrete panes to such an extent that removal of the discrete panes can be accomplished if egress from a building structure through a pane is desired or required. Further, treated glass panes 10 can accommodate multiple penetrations in the non-penetration resistance direction to allow return of firearm fire to desired targets if desired or necessary. Treated glass panes 10 can accommodate multiple penetrations associated with return-fire events without appreciably detracting from the opposite direction projectile penetration prevention aside from those areas immediately axially aligned with an opposite direction originating previous penetration of a treated glass pane 14. Further, the interference by treated glass pane 10 in the penetration allowing direction is negligible such that projectiles originating from the penetration allowing direction side of treated glass pane 10 only negligibly deviate from an intended travel path. Such considerations allows persons associated with the penetration accommodating side of treated glass panes 10 to suppress acts of aggression by persons facing the penetration resistance direction associated with the treated glass panes 10 in a safer and more efficient manner than similar activities from behind untreated glass panels 14.

Figure 3:
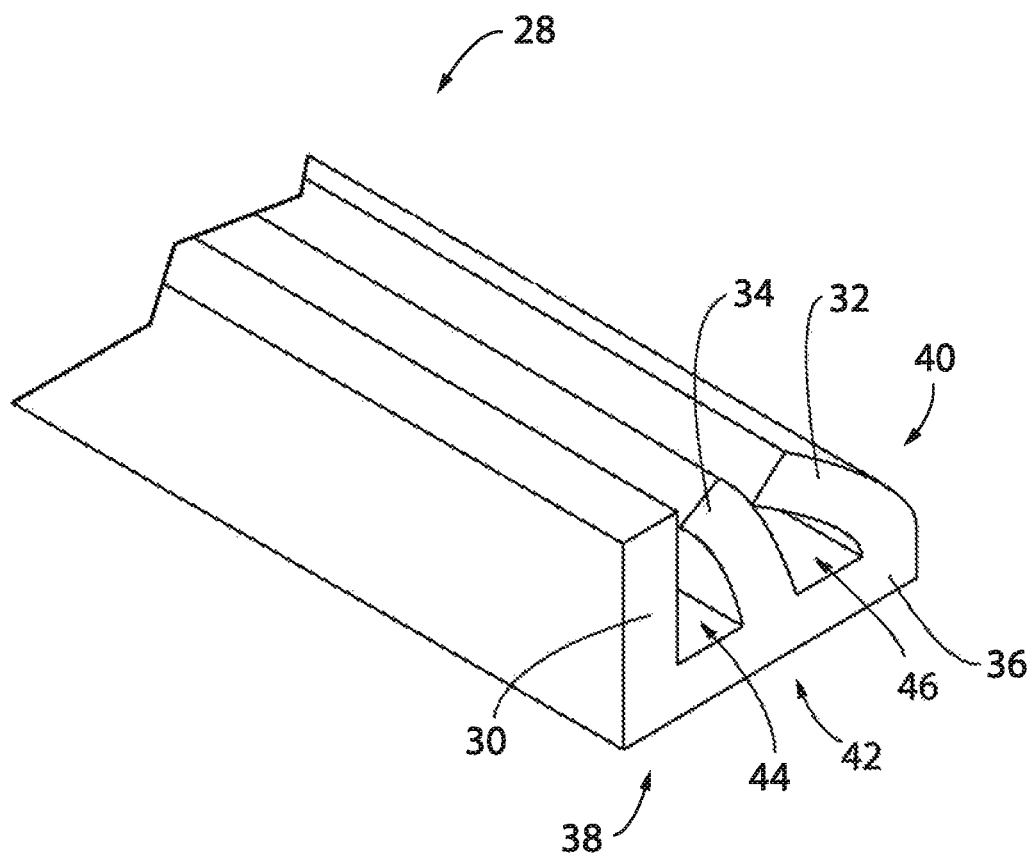
FIG. 3 is a perspective view of an optional gasket that is constructed to cooperate with a perimeter of a glass panel treated in accordance with the present invention.

Although it is appreciated that treated glass panes 10 as disclosed above can be manufactured and provided in various sizes and shapes as determined by original equipment manufacturers (OEM'S) specifications and such that OEM glass panels can be expeditious replaced with a similarly sized and shaped treated glass pane 10 such that the treated glass pane 10 cooperates with the respective underlying support or adjacent vehicle frame structures—such as a window opening defined by a vehicle door or body frame assembly, it is appreciated that other methodologies can be provided for supporting or otherwise securing treated glass panes 10 to an underlying support structure. As shown in FIG. 3, in one or more alternate embodiments of the present invention, the glass treatment system includes a gasket 28 that is preferably shaped to cooperate with a perimeter of one or more treated glass panels 10. In the representative embodiment of the invention, the gasket 28 is comprised of an extruded rubber. However, it is also contemplated that the gasket 28 may be molded in other known processes and from other materials similar to rubber.

Gasket 28 includes a first wall 30, a second wall 32, and a third wall 34. Each of the first wall 30, second wall 32, and third wall 34 extend upwardly from a bottom wall 36 of the gasket 28. It is contemplated that the first wall 30 may extend upwardly at any angle, the second wall 32 may extend upwardly at any angle the same or independent from the first wall 30, and the third wall 34 may extend upwardly at any angle the same or independent from the respective angles associated the first wall 30 and/or the second wall 32.

The first wall 30 extends upwardly from a first end 38 of the bottom wall 36 of the gasket 28, and the second wall 32 extends upwardly from a second end 40 of the bottom wall 36 of the gasket 28. Meanwhile, the third wall 34 extends upwardly from a middle location 42 of the bottom wall 36 of the gasket 28. While the representative embodiment of the invention depicts the middle location 42 as being located approximately equidistant from the first end 38 and the second end 40, it is contemplated that the middle location 42 may be located at any position along the bottom wall 36 between the first end 38 and the second end 40. Regardless of their relative positions, first, second, and third walls 30, 32, 34 of gasket 28 are oriented to define a first slot 44 that is formed between the first wall 30 and the third wall 34 and a second slot 46 that is formed between the third wall 34 and the second wall 32.

In the representative embodiment of the invention, the first wall 30 preferably extends in a generally upward direction relative to the bottom wall 36 at an angle of approximately 90° degrees. The third wall 34 extends upwardly from the bottom wall 36 at an angle less than 90° degrees relative to a direction facing the first wall 30, while the second wall 32 extends upwardly from the bottom wall 36 and toward the third wall 34 at an angle less than that of the third wall 34. This configuration allows the gasket 28 to more securely retain a respective treated glass window 10 associated with a respective slot 44, 46. The orientation of first, second, and third walls 30, 32, 34 relative to one another further provides a dampening performance in response to projectile impacts directed in the projectile penetration resistance direction while negligibly affecting the passage or trajectory of projectiles traveling in the projectile penetration accommodating direction.

Figure 4:
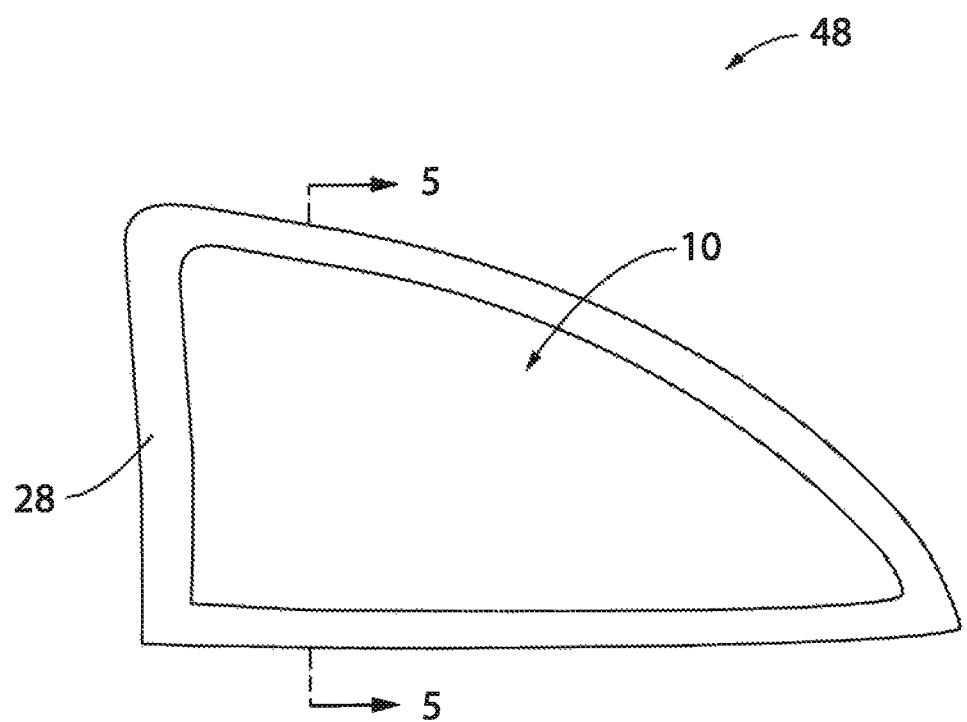
FIG. 4 is an elevational view of a multiple layered projectile resistant assembly according to an embodiment of the invention.
Figure 5A:
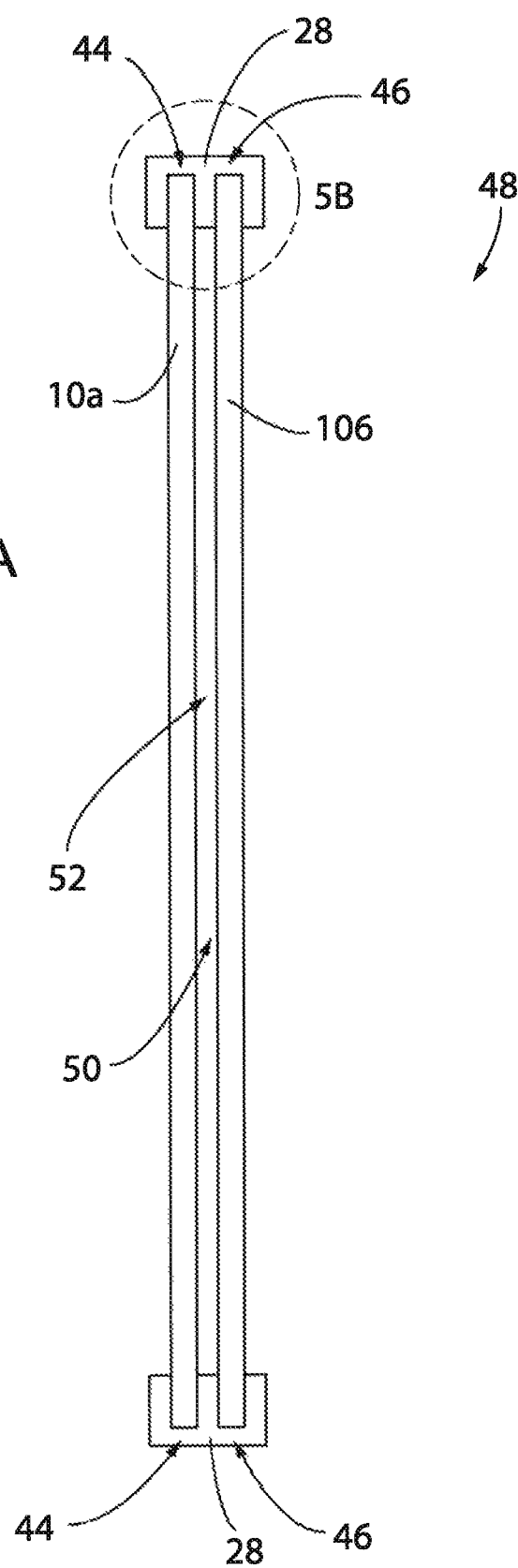
FIG. 5A is a cross-sectional view of the projectile resistant assembly of FIG. 4 take along line 5-5.
Figure 5B:
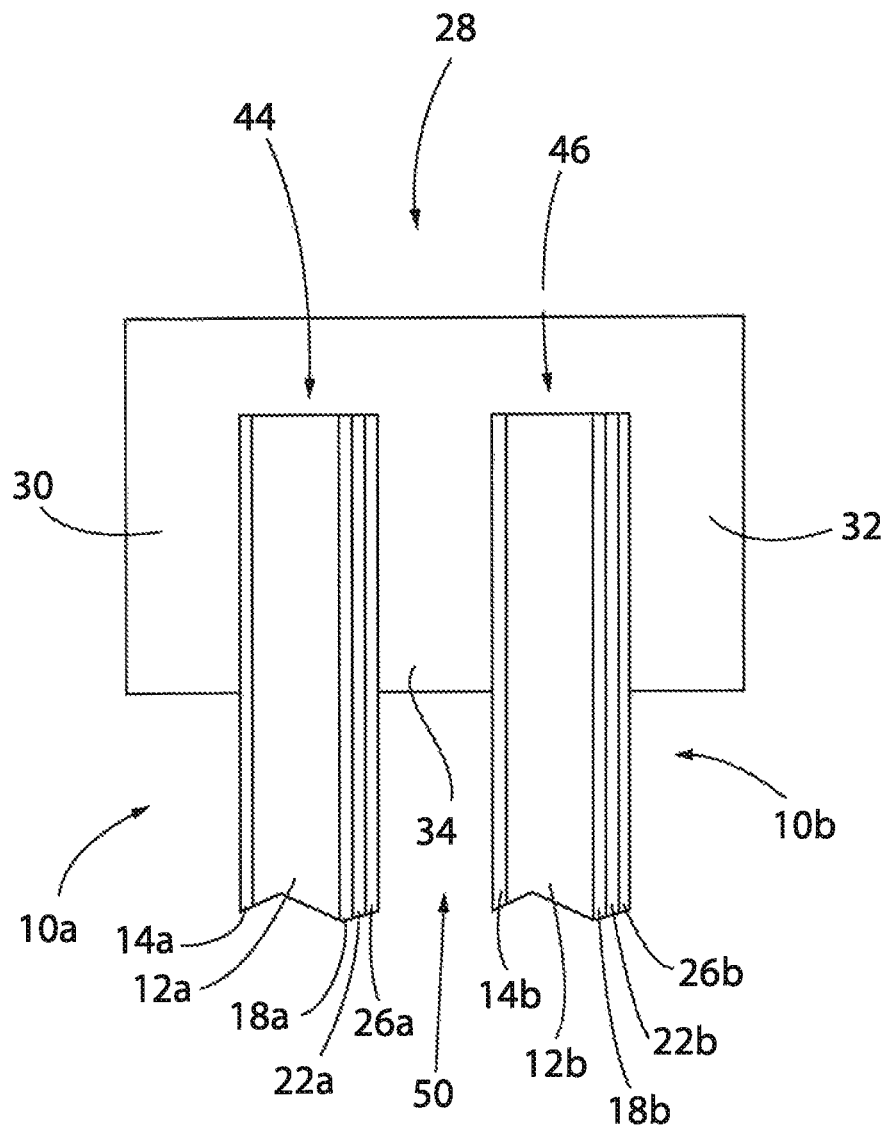
FIG. 5B is an enlarged view of the section 5B-5B of the projectile resistant assembly of FIG. 5A.

FIGS. 4, 5A, and 5B illustrate a transparent projectile resistant assembly 48 that includes at least one treated glass window 10 as described above with respect to FIGS. 1 and 2 and at least one gasket 28 as disclosed above with respect to FIG. 3. It is contemplated that the gasket 28 may traverse the entirety of or less than the entirety of the perimeter of the glass window 10. As shown in the cross-sectional view of FIG. 5A, a first treated glass window 10a is placed within the first slot 44 of the gasket 28, and a second treated glass window 10b is placed within the second slot 46 of the gasket 28. As a result, a gap 50 is formed between the first and second glass windows 10a, 10b. The gap 50 can be filled with an insulating gas 52, such as, but not limited to, argon.

In a preferred embodiment, gasket 28 bounds the perimeter between adjacent treated glass panes 10a, 10b and sealing cooperates therewith such that gap 50 can be pressurized about atmospheric pressure. The pressurization of gap 50, and the gas associated therewith, has been shown to improve the penetration resistance performance of system or assembly 48 by improving dispersion of the energy associated with mitigating passage of projectiles through treated glass pane assembly 48.

While the representative embodiment of the invention shows the gasket 28 having two slots 44, 46, and therefore two glass windows 10a, 10b with a single gap 50 disposed therebetween, it is also contemplated that the gasket may include any number (n) of slots 44, 46, such that the projectile resistant assembly 48 may include any number (n) of glass windows 10, and the projectile resistant assembly 48 may include any number (n–1) of gaps 50 disposed between the glass windows 10. Such considerations allow assembly 48 to be provided in different configurations depending on the degree of projectile resistance that assembly 48 is intended to withstand and for a desired duration or degree of degradation in both the non-penetrative and penetrable directions before failure of the penetration resistance of the resultant assembly.

As further shown in FIG. 5B, the first and second glass windows 10a, 10b of the projectile resistant assembly 48 are oriented in the same direction. For example, the first side 16a of the glass layer 12a of the first glass window 10a is oriented toward the first side 54 of the projectile resistant assembly 48, while the first side 16b of the glass layer 12b of the second glass window 10b is oriented toward the gap 50. The second side 20a of the glass layer 12a of the first glass window 10a is oriented toward the gap, while the second side 20b of the glass layer 12b of the second glass window 10b is oriented toward the second side 56 of the projectile resistant assembly 48.

As stated earlier, the configuration of the elements associated with each treated glass window 10 resist and preferably prevent passage of multiple projectiles through each treated glass window 10 in one direction, while allowing passage of projectiles through the treated glass window 10 in the other direction with negligible impact on the trajectory of the projectiles traveling in the penetrable direction. As such, by orienting the first and second treated glass windows 10a, 10b in the same direction, it ensures that penetration associated with movement of a projectile is prevented, resisted, or mitigated in one direction yet tolerated in the opposite direction.

Figure 6:
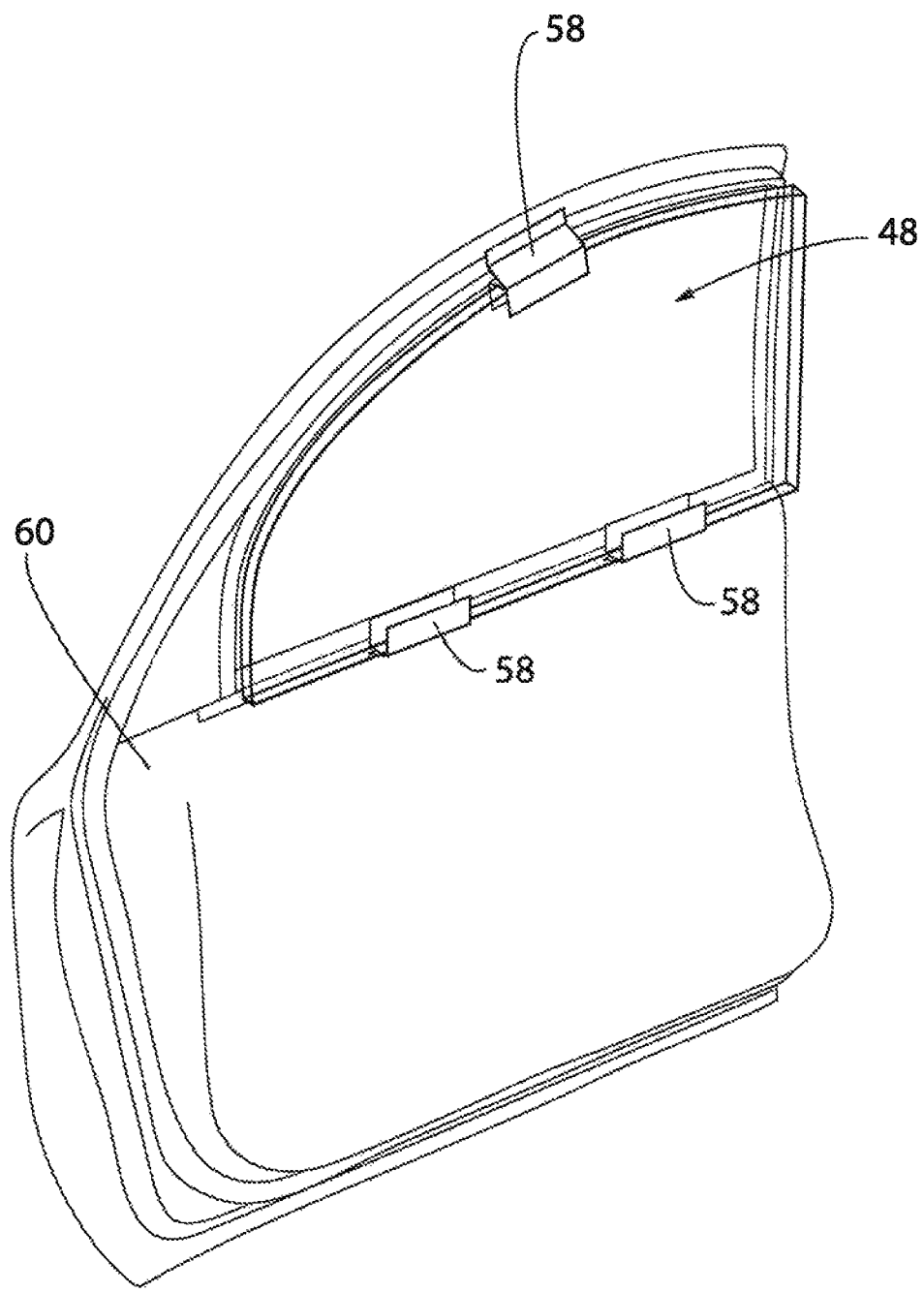
FIG. 6 is a perspective view of a mounting arrangement associated with securing multiple layers of treated glass panels to form a more robust projectile resistant assembly to an underlying vehicle.

Another embodiment of the invention relates to retrofitting existing windows of a car, home, or other object to include a projectile resistant assembly 48, as shown in FIGS. 4, 5A, and 5B. In particular, FIG. 6 illustrates the use of one or more brackets 58 according to one embodiment of the invention to secure projectile resistant assembly 48 to a frame member or other supporting structure of a vehicle, automobile, or other structure such as a car 60. Each bracket 58 is configured to interfit with a section of the projectile resistant assembly 48 and configured to be mechanically coupled to the underlying structure of the car 60. While FIG. 6 illustrates the use of three (3) brackets 58 to secure the projectile resistant assembly 48 to the car 60, it is contemplated that any number of brackets 58 may be used to secure the projectile resistant assembly 48 relative to the underlying vehicle 60. As described in further detail below, FIGS. 7-10, 11-22, and 23-35 illustrate multiple embodiments of brackets 58 that are configured to couple respective treated window panels 10 to an underlying object, such as, but not limited to, a car 60 and more particularly, a vehicle side door. As disclosed above, it is further appreciated that each of the original or OEM window panels could be treated in the manner disclosed above and that additional panel assembly 48 enhances the unidirectional penetration resistance associated with the final configuration of the resultant vehicle.

Figure 7:
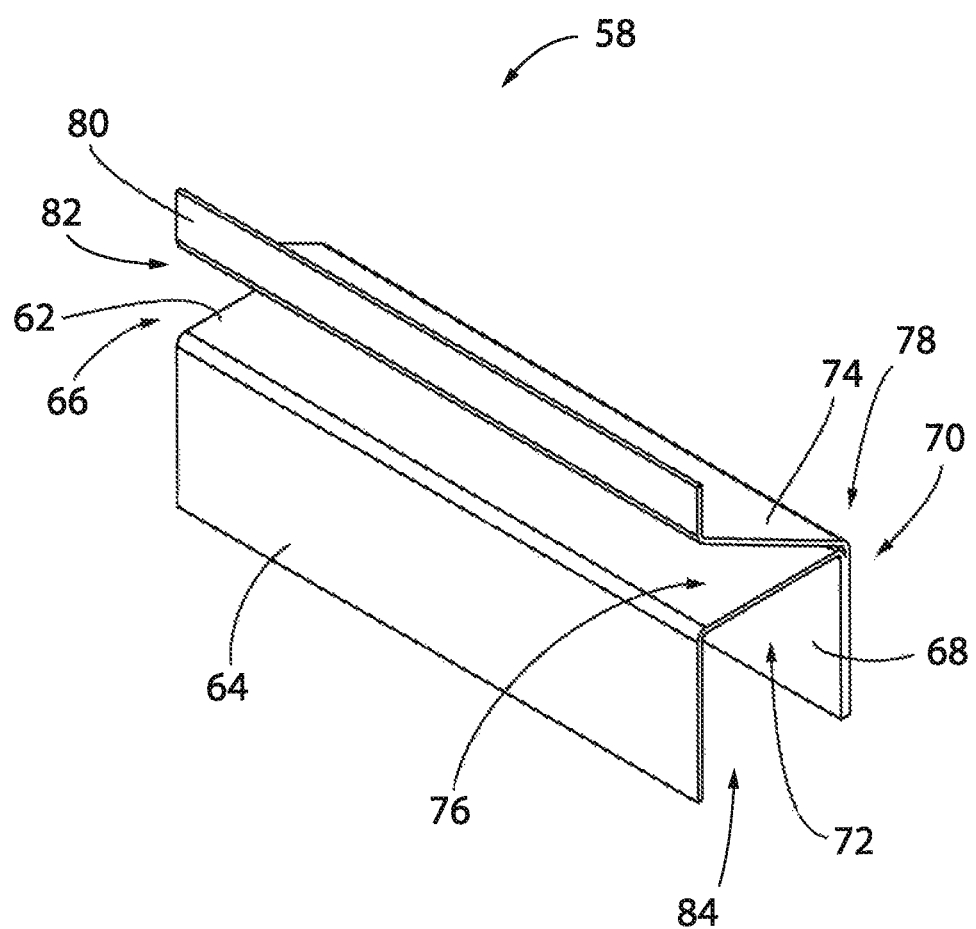
FIG. 7 is a perspective view of a mounting bracket associated with the mounting arrangement shown in FIG. 6.

FIG. 7 shows a perspective view of the bracket 58 shown in FIG. 6 as securing the projectile resistant assembly 48 relative to the vehicle 60. In this representative embodiment of the invention, the bracket 58 includes a main body 62, a first arm 64 extending outwardly from a first side 72 of the main body 62 at a first end 66 of the main body 62 perpendicular thereto, and a second arm 68 extending outwardly from the first side 72 of the main body 62 at a second end 70 of the main body 62 perpendicular thereto and in the same direction as the first arm 64. As a result, first and second arms 64, 68 are oriented generally parallel to one another. The resulting U-shape formed by the main body 62, first arm 64, and second arm 68 creates a receiving slot 84 that is configured to receive the projectile resistant assembly 48. While FIG. 7 illustrates the first arm 64 extending perpendicularly from the main body 62, it is also contemplated that the first arm 64 may extend outwardly from the main body 62 at any angle other than 90°. Similarly, alternative embodiments of the invention may include the second arm 68 extending outwardly from the main body 62 at any angle other than 90°.

The bracket 58 further includes a third arm 74 extending outwardly from a second side 76 of the main body 62 at the second end 70 of the main body 62. In this representative embodiment of the invention, the third arm 74 extends outwardly from the second side 76 of the main body 62 at an angle less than 90°. As such, the third arm 74 extends away from the main body 62 while simultaneously extending toward a vertical plane aligned with the first end 66 of the main body 62 and the first arm 64 extending therefrom. While FIG. 7 depicts the third arm 74 extending to the vertical plane aligned with the first arm 64, it is contemplated that the third arm 74 may extend to any point either before or beyond the vertical plane aligned with the first arm 64.

As shown in FIG. 7, a first end 78 of the third arm 74 is in contact with the second end 70 of the main body 62, while a fourth arm 80 extends from a second end 82 of the third arm 74. The fourth arm 80 extends upwardly from the second end 82 of the third arm 74. In this representative embodiment of the invention, the fourth arm 80 extends upwardly from the second end 82 of the third arm 74 at an angle greater than 90° so as to be oriented perpendicular to the main body 62. As a result, the fourth arm 80 is also either aligned with or oriented parallel to the vertical plane aligned with the first arm 64. The fourth arm 80 of the bracket is configured to be mechanically secured to the car 60. The canted or crossing orientation of the respective arms further accommodates impact absorption associated with projectiles directed toward the projectile penetration resistant side of treated glass panels 10.

Figure 8:
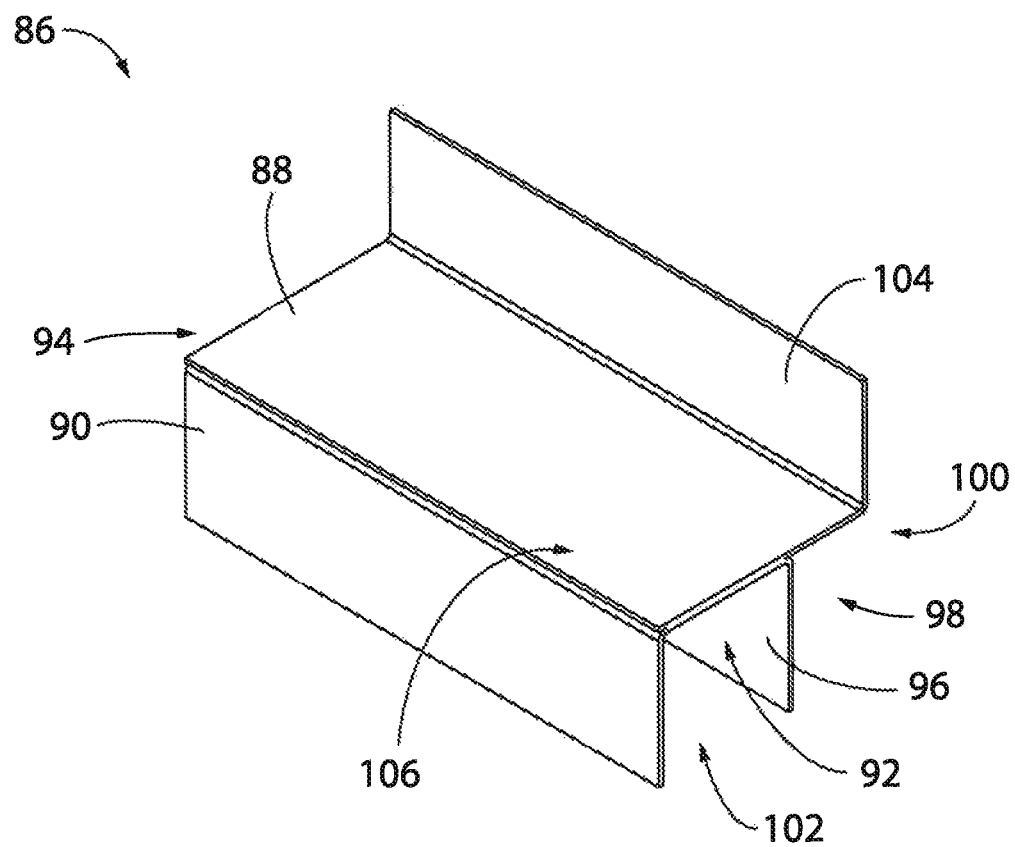
FIG. 8 is a view similar to FIG. 7 of a mounting bracket according to an alternate embodiment of the invention.

Next, FIG. 8 depicts a perspective view of a bracket 86 according to another embodiment of the invention. The bracket 86 includes a main body 88, a first arm 90 extending outwardly from a first side 92 of the main body 88 at a first end 94 of the main body 88 perpendicular thereto, and a second arm 96 extending outwardly from the first side 92 of the main body 88 at a middle location 98 of the main body 88 perpendicular thereto and in the same direction as the first arm 90. As shown in FIG. 8, the middle location 98 of the main body 88 is located between the first end 94 of the main body 88 and a second end 100 of the main body 88. In other words, the main body 88 extends beyond the second arm 96. Further, it is contemplated that the middle location 98 may be located at any point between the first and second ends 94, 100 of the main body and is not limited to the midpoint therebetween. Similar to the bracket 58 shown in FIG. 7, the resulting U-shape formed by the main body 88, first arm 90, and second arm 96 creates a receiving slot 102 that is configured to receive the projectile resistant assembly 48. Additionally, while the first arm 90 is shown as extending perpendicularly from the main body 88, it is also contemplated that the first arm 90 may extend outwardly from the main body 88 at any angle other than 90°. In turn, alternative embodiments of the invention may include the second arm 96 extending outwardly from the main body 88 at any angle other than 90°.

The bracket 86 also includes a third arm 104 that extends outwardly from a second side 106 of the main body 88 at the second end 100 of the main body 88 perpendicular thereto. However, it is also contemplated that the third arm 104 may extend outwardly from the second side 106 of the main body 88 at an angle other than 90°. The third arm 104 of the bracket 86 is configured to be mechanically secured to the car 60.

Figure 9:
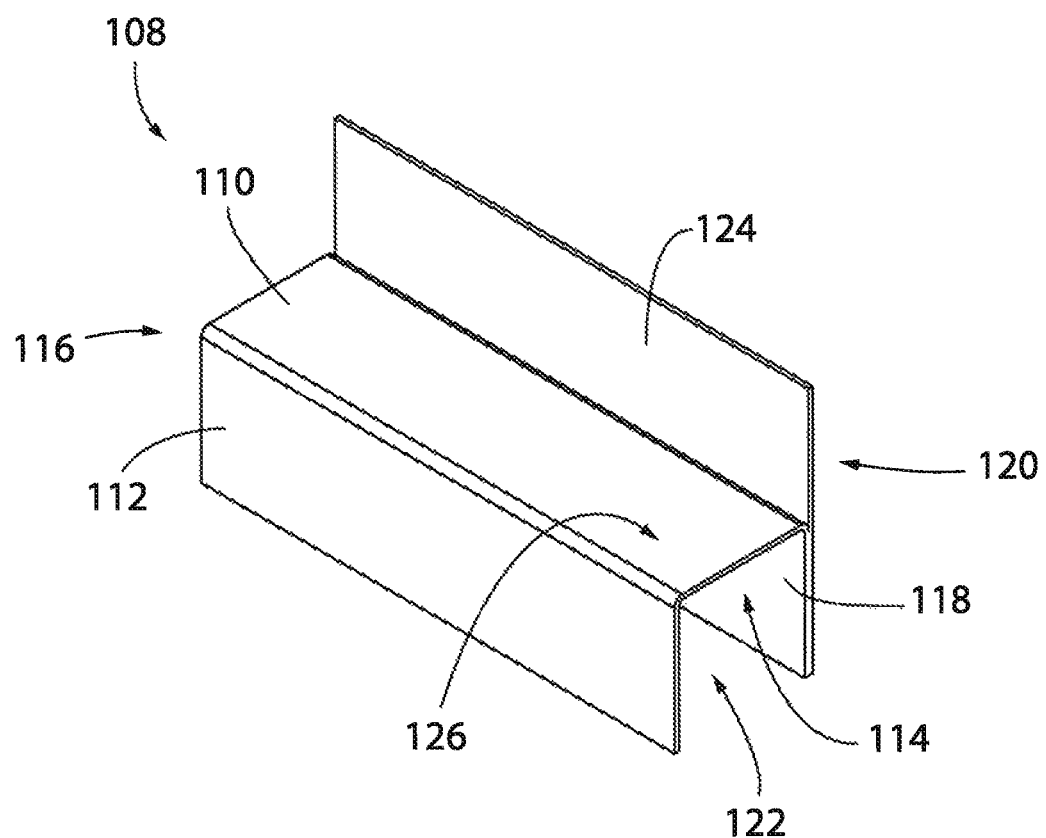
FIG. 9 is a view similar to FIGS. 7 and 8 of a mounting bracket according to another embodiment of the invention.

Now referring to FIG. 9, a bracket 108 is shown according to another embodiment of the invention. The bracket 108 includes a main body 110, a first arm 112 extending outwardly from a first side 114 of the main body 110 at a first end 116 of the main body 110 perpendicular thereto, and a second arm 118 extending outwardly from the first side 114 of the main body 110 at a second end 120 of the main body 110 perpendicular thereto and in the same direction as the first arm 112. Similar to the previously described brackets, the resulting U-shape formed by the main body 110, first arm 112, and second arm 118 creates a receiving slot 122 that is configured to receive the projectile resistant assembly 48. While the first arm 112 is shown as extending perpendicularly from the main body 110, it is also contemplated that the first arm 112 may extend outwardly from the main body 110 at any angle other than 90°. Similarly, it is contemplated that the second arm 118 extending outwardly from the main body 110 at any angle other than 90°.

The bracket 108 also includes a third arm 124 extending outwardly from a second side 126 of the main body 110 at the second end 120 of the main body 110 perpendicular thereto. In this representative embodiment of the invention, the third arm 124 is aligned vertically with the second arm 118. The third arm 124 of the bracket 108 is configured to be mechanically secured to the car 60. While FIG. 9 shows the third arm 124 as extending outwardly from the second side 126 of the main body perpendicular thereto, the third arm 124 may be oriented at any angle other than 90° in other embodiments of the invention.

Figure 10:
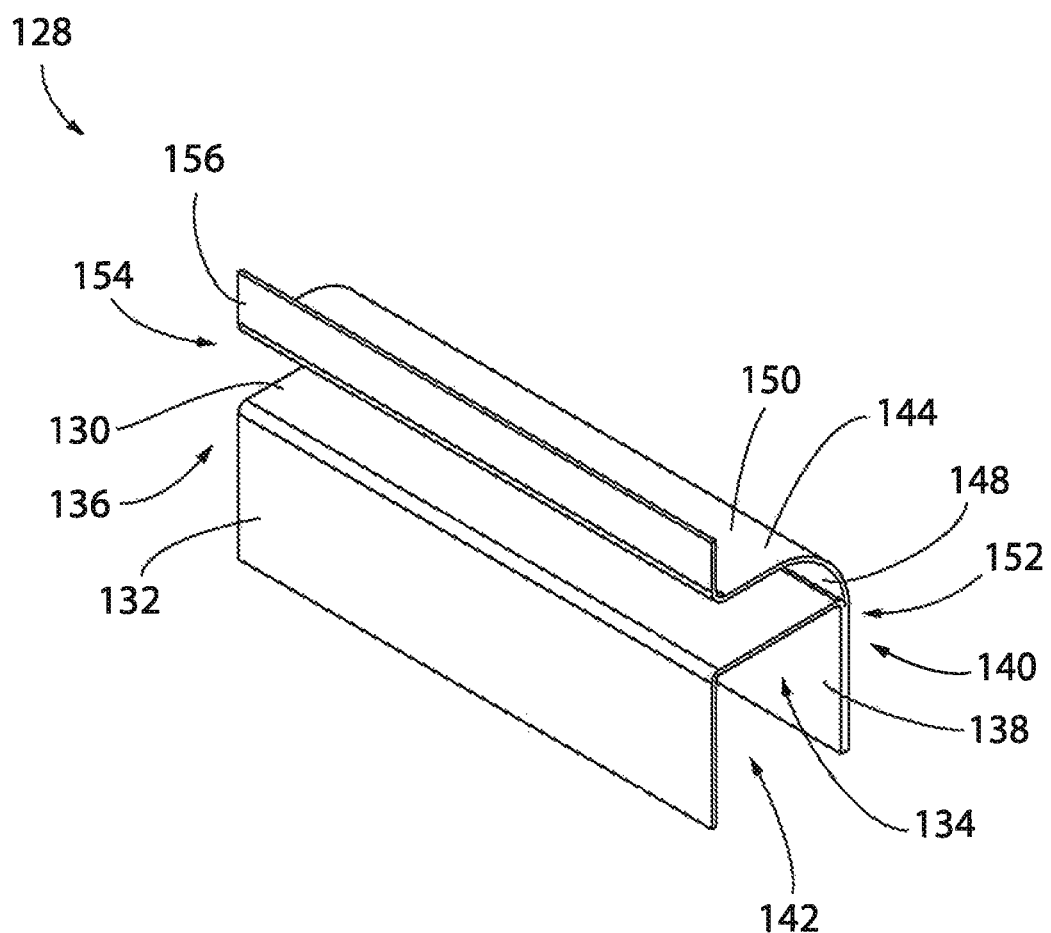
FIG. 10 is a view similar to FIGS. 7-9 of a mounting bracket according to yet another embodiment of the invention.
Figure 11:
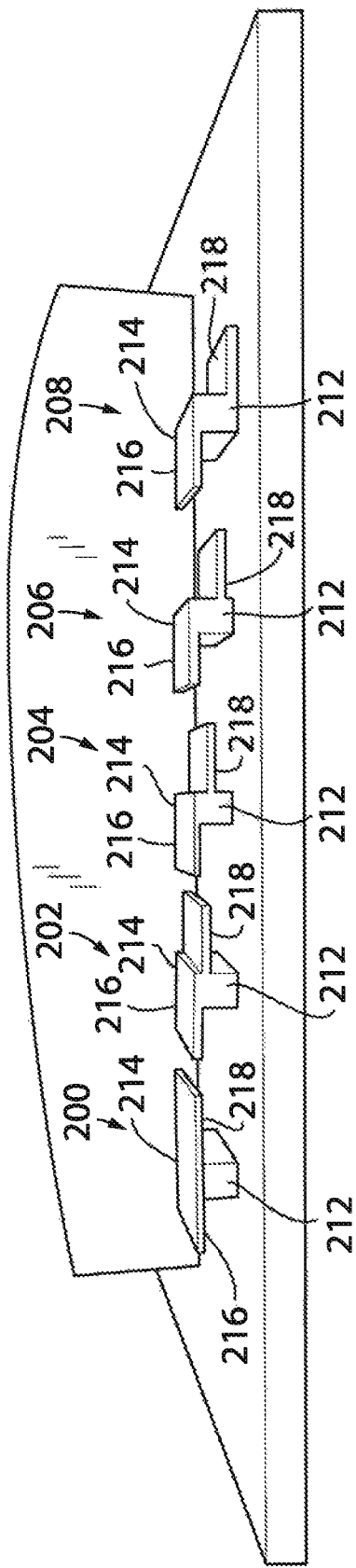
FIGS. 11-22 show various views of mounting arrangements associated with securing transparent projectile penetration resistant materials relative to automotive structures such as a door of an automobile or other vehicle.
Figure 12:
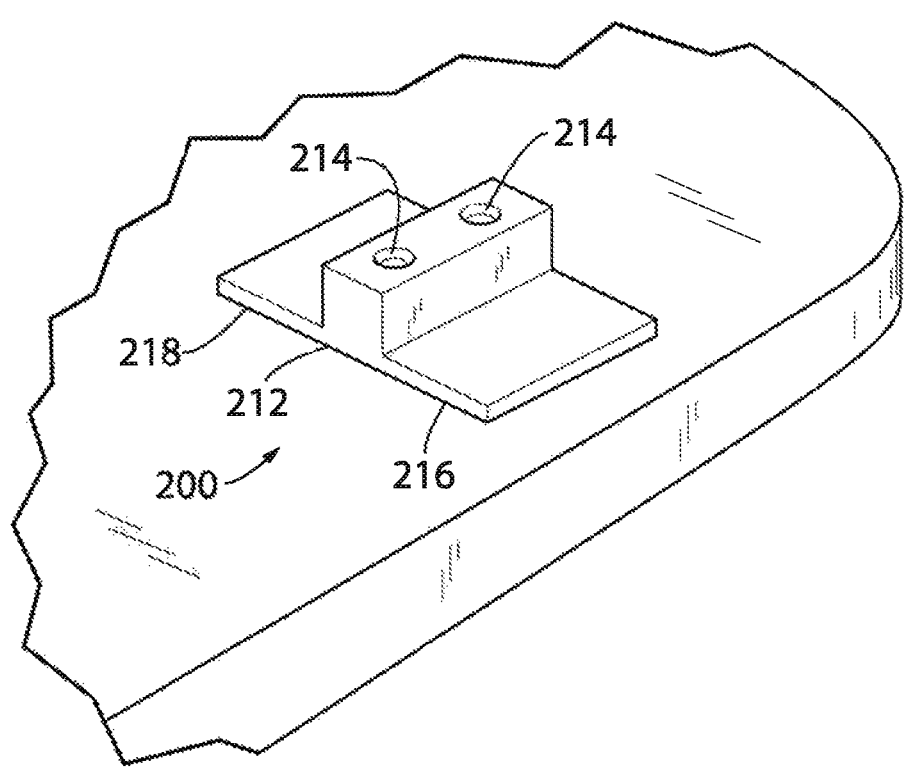
Figure 13:
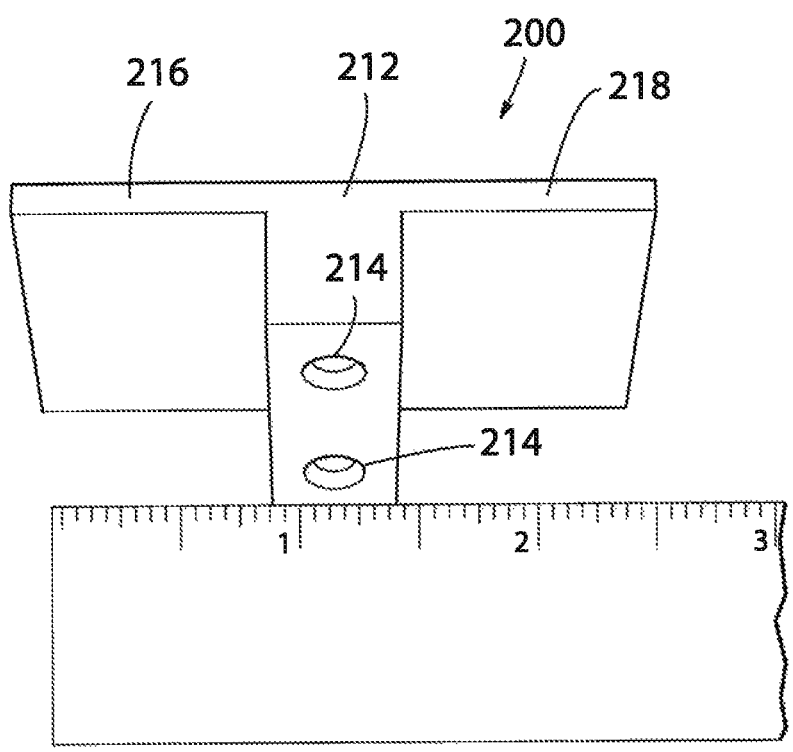

Next, FIG. 10 illustrates a bracket 128 according to yet another embodiment of the invention. Similar to previously described brackets, the bracket 128 includes a main body 130, a first arm 132 extending outwardly from a first side 134 of the main body 130 at a first end 136 of the main body 130 perpendicular thereto, and a second arm 138 extending outwardly from the first side 134 of the main body 130 at a second end 140 of the main body 130 perpendicularly thereto. The resulting u-shape formed by the main body 130, first arm 132, and second arm 138 creates a receiving slot 142 that is configured to receive the projectile resistant assembly 48. It is noted that in other embodiments of the invention the first arm 132 may extend outwardly from the first side 134 main body 130 at any angle other than 90°, and the second arm 128 may also extend outwardly from the first side 134 of the main body 130 at any angle other than 90°.

Additionally, the bracket 128 includes a third arm 144 extending outwardly from a second side 146 of the main body 130 at the second end 140 of the main body 130. In this representative embodiment of the invention, the third arm 144 includes an arced portion 148 and a flat portion 150. The arced portion 148 is located at a first end 152 of the third arm 144, which is in contact with the second end 140 of the main body 130, and the flat portion 150 is located at a second end 154 of the third arm. As shown in FIG. 10, the third arm 144 extends outwardly from the second side 146 of the main body 130 at its first end 152. The orientation of the third arm 144 is then altered by the arc portion 148 so that the flat portion 150 of the third arm 144 is oriented parallel to the main body 130 and extends toward a vertical plane aligned with the first arm 132. As a result, the third arm 144 extends outwardly from the second side 146 of the main body 130 and toward the vertical plane aligned with the first arm 132. In other embodiments of the invention, the flat portion 150 of the third arm 144 may be oriented at any angle other than parallel to the main portion 130.

While FIG. 10 illustrates the third arm 144 as extending to the vertical plane aligned with the first arm 132, it is also contemplated the third arm 144 may extend beyond or stop before the vertical plane aligned with the first arm 132. The bracket 128 further includes a fourth arm 156, which extends upwardly from the third arm 144 so as to be oriented parallel to or aligned with the vertical plane aligned with the first arm 132. The fourth arm 156 is configured to be mechanically coupled to the car 60. It is appreciated that, depending on the configuration and/or construction of the underlying vehicle, one or more of brackets 58, 86, 108, 128 may be used to secure a discrete projectile penetration resistant assembly relative to an underlying vehicle.

Preferably, when associated with a respective vehicle, treated panel assemblies or system 48 does not interfere with operability or the aesthetics of the underlying vehicle. That is, when treated, the OEM treated glass pane 10 remains operable to be open and closed. When equipped with resistance assembly 48, resistance assembly does not interfere with interaction with door mounted controls or the interior trim customarily supported by the door frame. It should further be appreciated that the comparatively light-weight construction associated with the unidirectional projectile penetration resistance system disclosed herein mitigates the concerns associated with reinforcing the frame and suspension features of the underlying vehicle while maintaining the projectile penetration resistance performance common to other such system and many systems which do not accommodate unidirectional penetration tolerance.

It should further be appreciated the relative unidirectional projectile resistance associate with treated window pane 10 and resistance assembly 48 can be manipulated by providing 1-n numbers of treated surfaces associated with the unidirectional penetration direction. That is, the OEM window pane may be treated or left untreated provided supplemental unidirectional penetration layers are disposed proximate the OEM window pane. It is further appreciated that the penetration resistance performance of one or more of the treated panels can be manipulated by replacing the glass panel associated with supporting the treatment layers with other materials such as projectile penetration resistant materials such as Lexan or other projectile penetration resistant materials such as Plexiglas. It is further appreciated that, in some applications, it may be desirable to leave the OEM vehicle window pane untreated but associated with the selectively removable treatment system 48 that includes one or more discrete treated panels that include a glass or other material treatment supporting substrate material. Such a consideration allows the underlying vehicle to be returned to a near identical OEM configuration should it be subsequently desired to eliminate the projectile penetration resistance associated with the same.

FIGS. 11-22 show various views of alternate exemplary embodiments of mounting assemblies 200, 202, 204, 206, 208 associated with securing a unidirectional penetration resistant panel relative to a support structure—such as a vehicle door frame 210. Each mounting assembly 200, 202, 204, 206, 208 includes a center portion 212 having one or more openings 214 formed therein. Preferably, as disclosed further below, openings 214 are threaded to cooperate with a respective fastener associated with securing the respective mounting assembly 200, 202, 204, 206, 208 relative to the support clip 220 is described further below with respect to FIG. 14.

Each assembly 200, 202, 204, 206, 208 includes a first portion 216 and a second portion 218 that extend an opposite lateral directions relative to the respective center portion 212. Although each respective first portion 216 is associated with a respective lateral end of center portion 212, second portion 218 is oriented to extend from center portion 212 at a respective location relative to center portion 212 in a direction that is axially aligned with an axis associated with openings 214. That is, wherein second portion 218 associated with mount assembly 200 is oriented to be generally aligned with first portion 216 thereof, second portion 218 associated with mount assembly 208 is oriented at the opposite lateral end associated with center portion 212 such that first portion 216 and second portion 218 associated with mount assembly 208 are oriented at generally opposite lateral ends of center portion 212 and extend an opposite lateral directions relative thereto. As disclosed further below, respective first portion 216 and respective second portion 218 are oriented along the lateral axis associated with center portion 212 of respective mount assemblies 200, 202, 204, 206, 208 to facilitate the mounting of transparent penetration resistant panel having a desired thickness relative to an underlying support member such as door frame 210.

In another embodiment, respective mount assemblies 200, 202, 204, 206, 208 are constructed to cooperate with door frame 210 and a penetration resistant panel associated therewith so as to provide bypass operability associated with discrete portions of transparent penetration resistant panels such that the discrete panels remain generally surrounded by a frame structure such as door frame 210.

Figure 14:
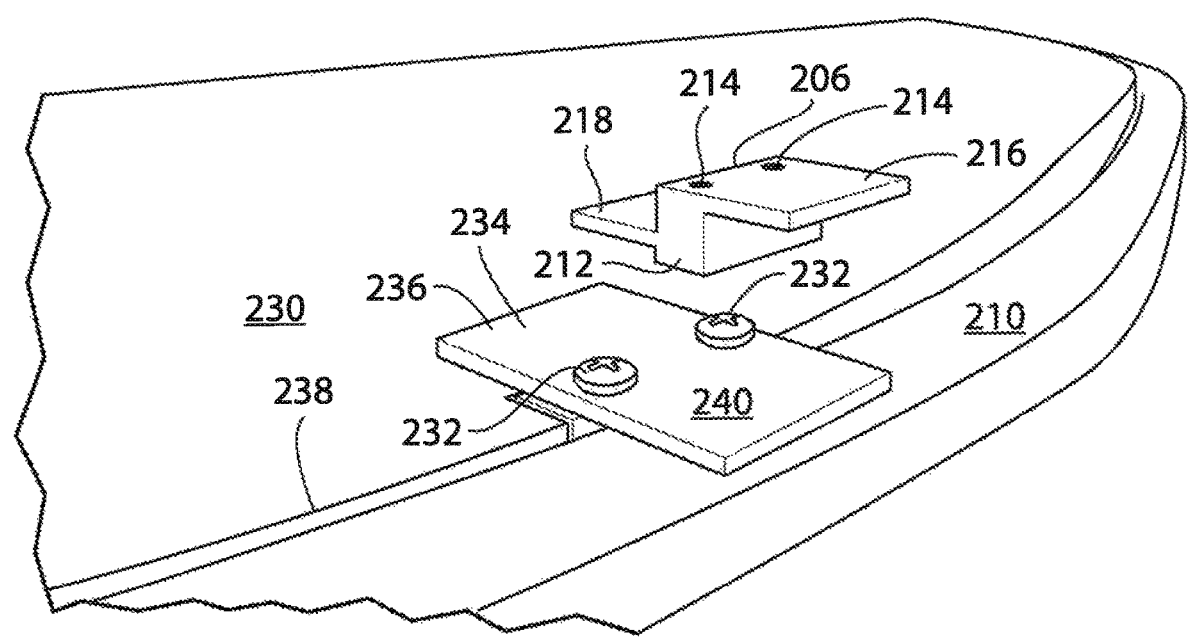

As shown in FIG. 14, respective support assemblies 200, 202, 204, 206, 208 are oriented to be generally intermittently circumferentially disposed about a respective transparent unidirectional penetration resistant panel 230. Respective openings 214 are configured to cooperate with respective fasteners 232 constructed the pass through a clip 234 such that a first portion 236 of a respective clip 234 extends in an inboard radial direction relative to an edge 238 associated with panel 230 and an opposing portion 240 extends in a radially outboard direction relative to an imaginary line that extends between fasteners 232.

Figure 15:
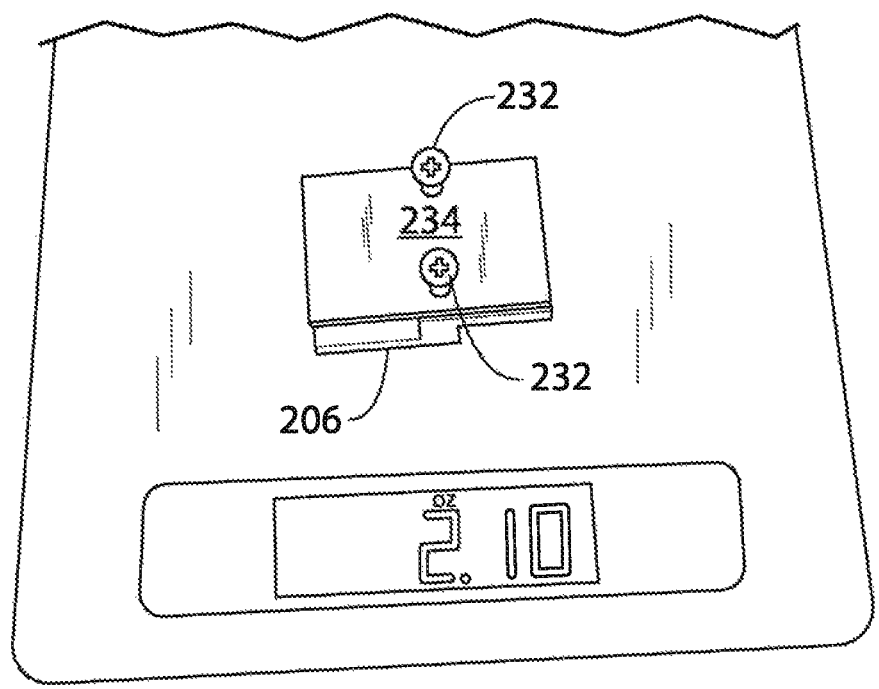
Figure 16:
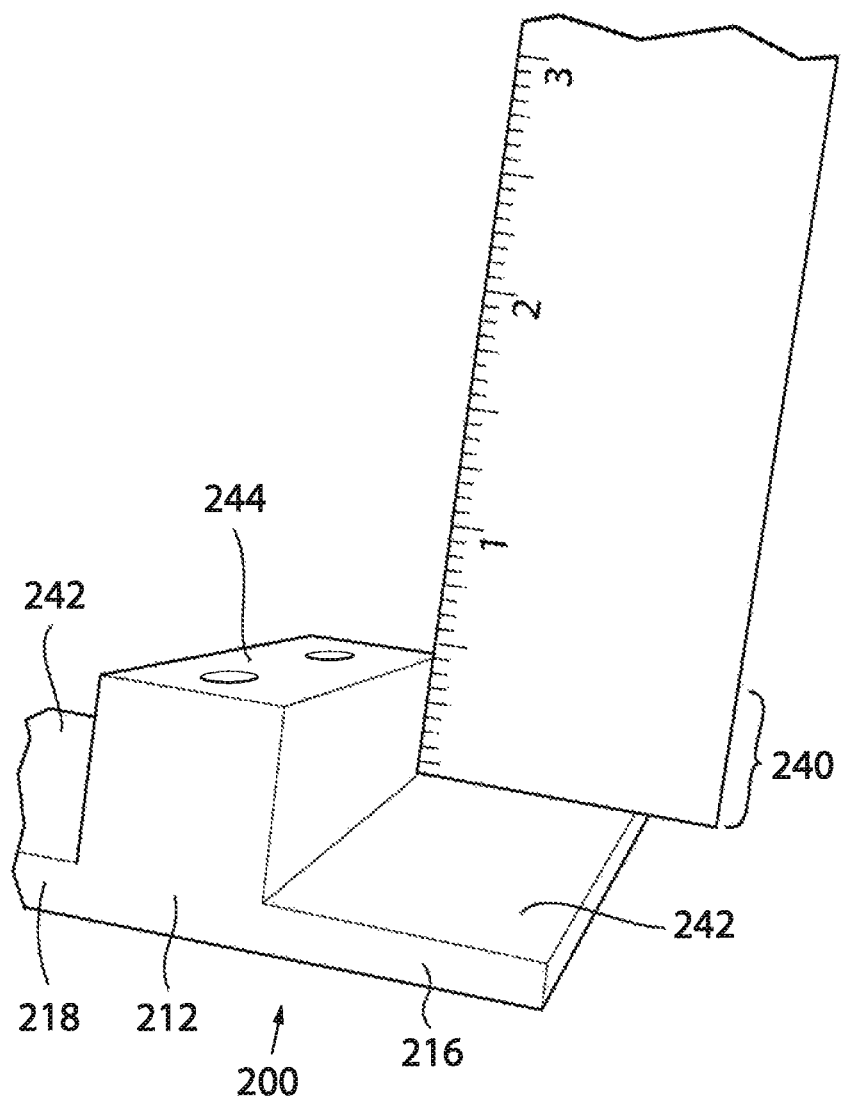

As shown in FIG. 15, each respective mount assembly 200, 202, 204, 206, 208, a respective clip 234, and respective fasteners 232 associated therewith maintains a relatively lightweight mounting assembly associated with securing a respective panel 230 relative to a support structure such as door frame 210. Referring to FIG. 16, a respective distance 240 is provided between an upward facing surface 242 associated with respective portions 216, 218 of each respective mount assembly 200, 202, 204, 206, 208 and an end face 244 associated with the respective center portion 212. Dimension 240 associated with respective first and second portions 216, 218 is configured to accommodate secure capture of a respective panel 230 therebetween so as to allow secure mounting of respective panels 230 relative to door frame 210.

Figure 17:
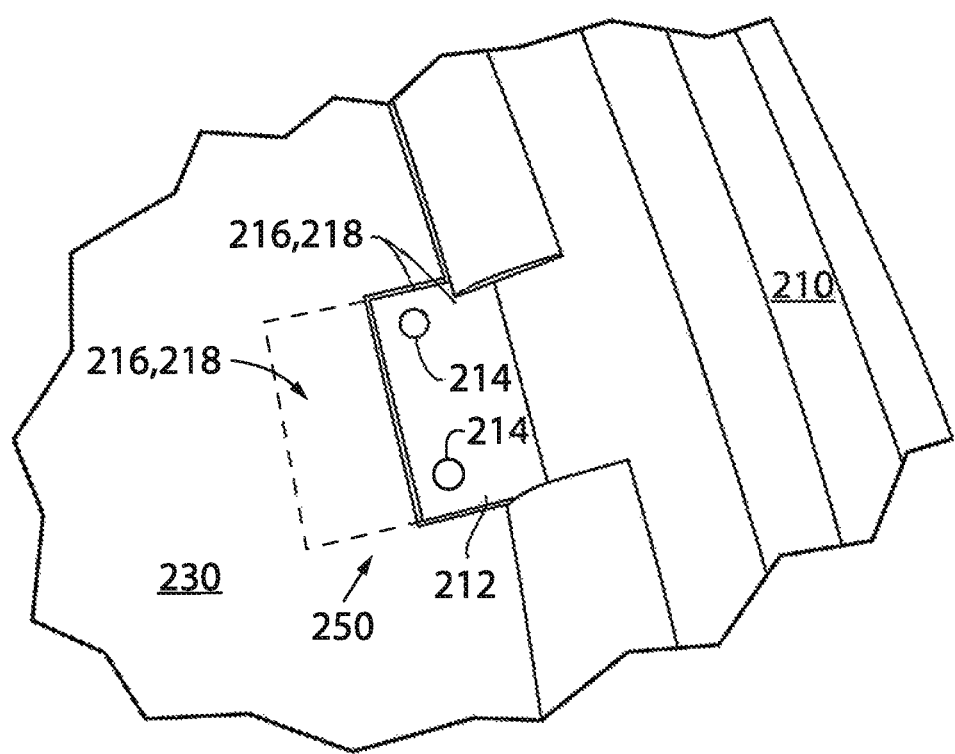
Figure 18:
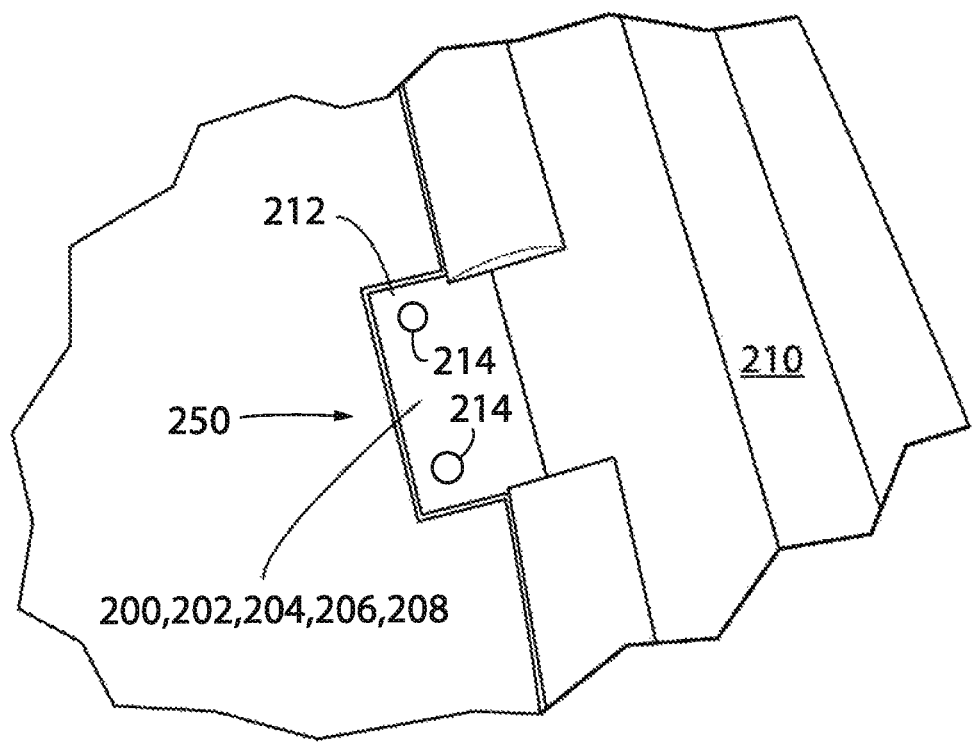

Referring to FIGS. 17 and 18, panel 230 can be constructed to include a cutout 250 associated with receiving center portion 212 of a respective mount assembly 200, 202, 204, 206, 208 such that a respective portion 216, 218 associated with the respective mount assembly 200, 202, 204, 206, 208 provides an interfering engagement with a portion of door frame 210 and an opposing respective portion 216, 218 extends in an inboard radial direction relative to panel 230 so as to overlap therewith.

Figure 19:
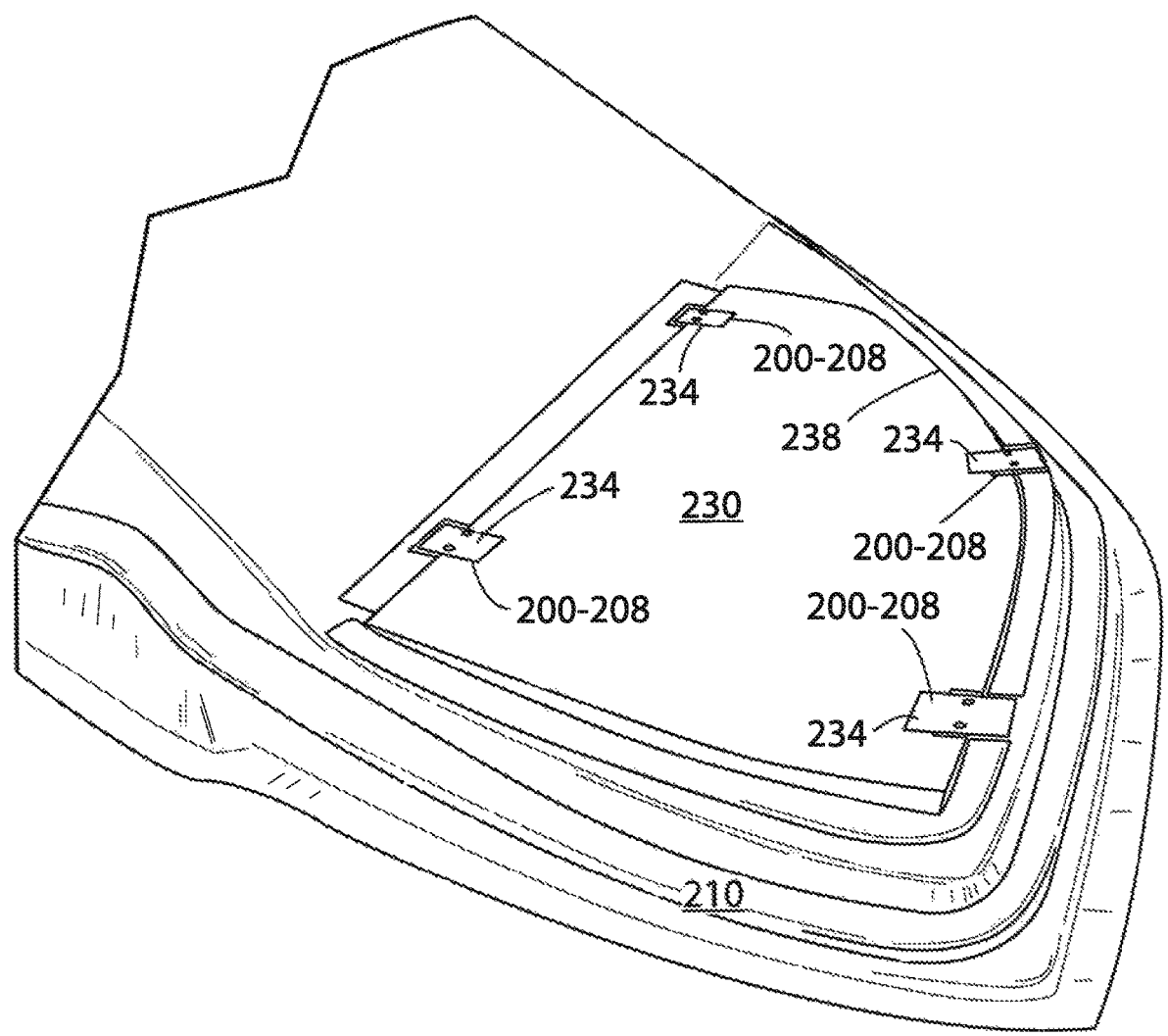

As shown in FIG. 19, a respective panel 230 is secured to door frame 210 via a plurality of associated mount assemblies 200-208 that are oriented at various radial locations relative to perimeter 238 associated with panel 230 such that respective portions 216, 218 of respective mount assemblies 200-208, corresponding clips 234, and the respective portions 236, 240 thereof provide an overlapping orientation relative to both door frame 210 and panel 230 relative to the opposite lateral sides of thereof.

Figure 20:
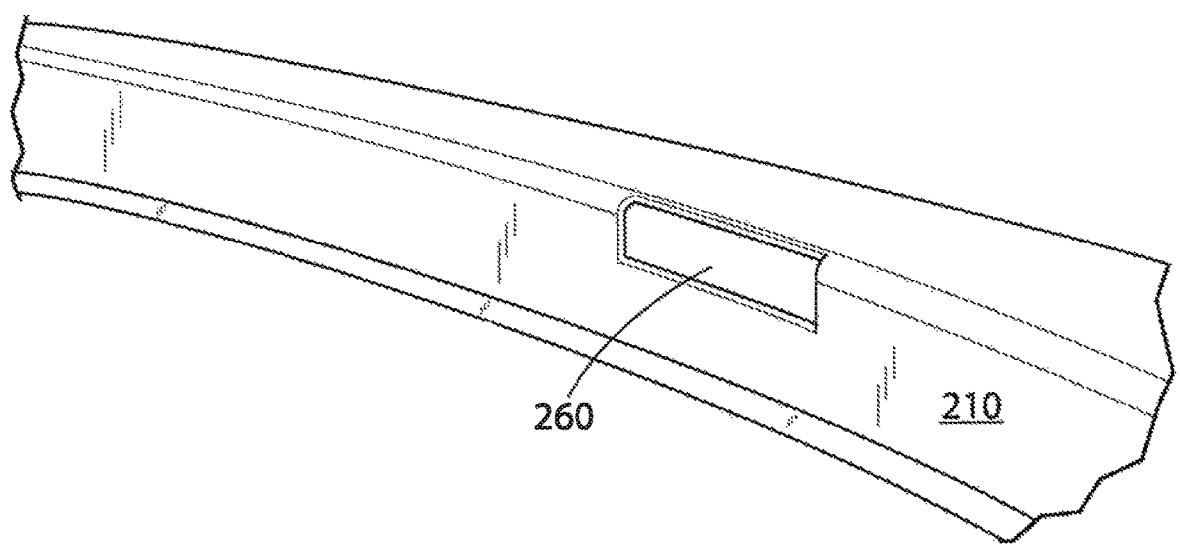
Figure 21:
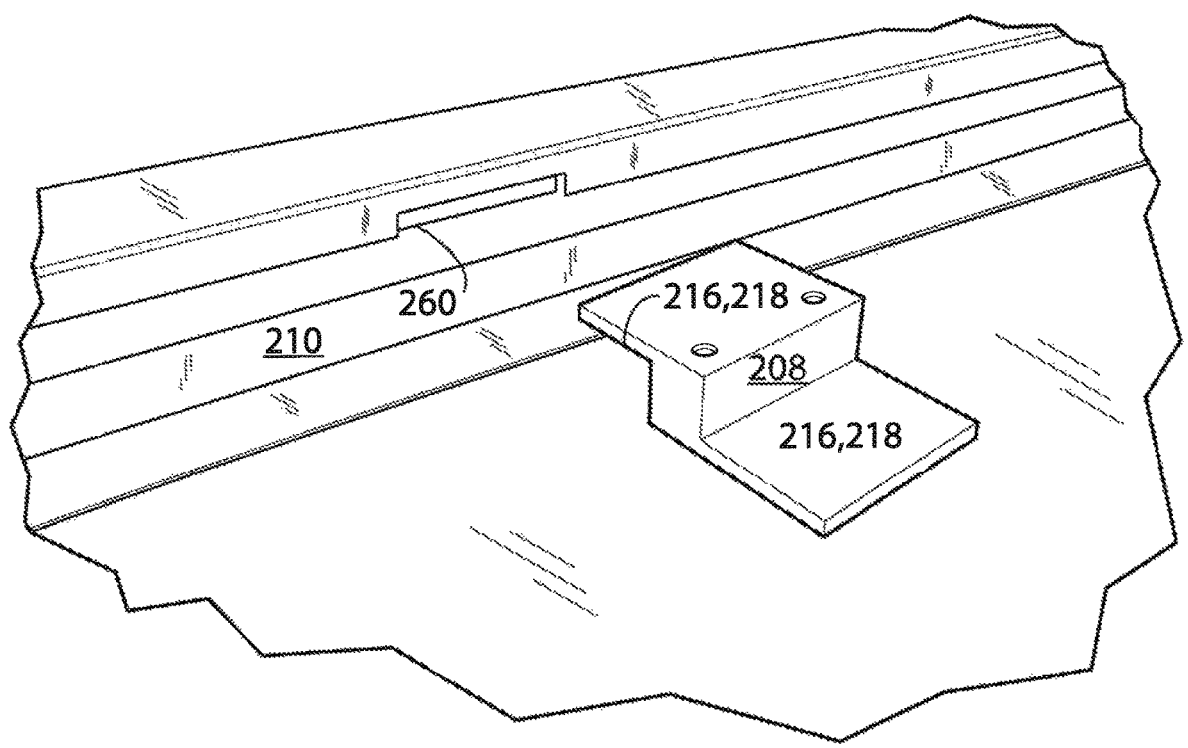
Figure 22:
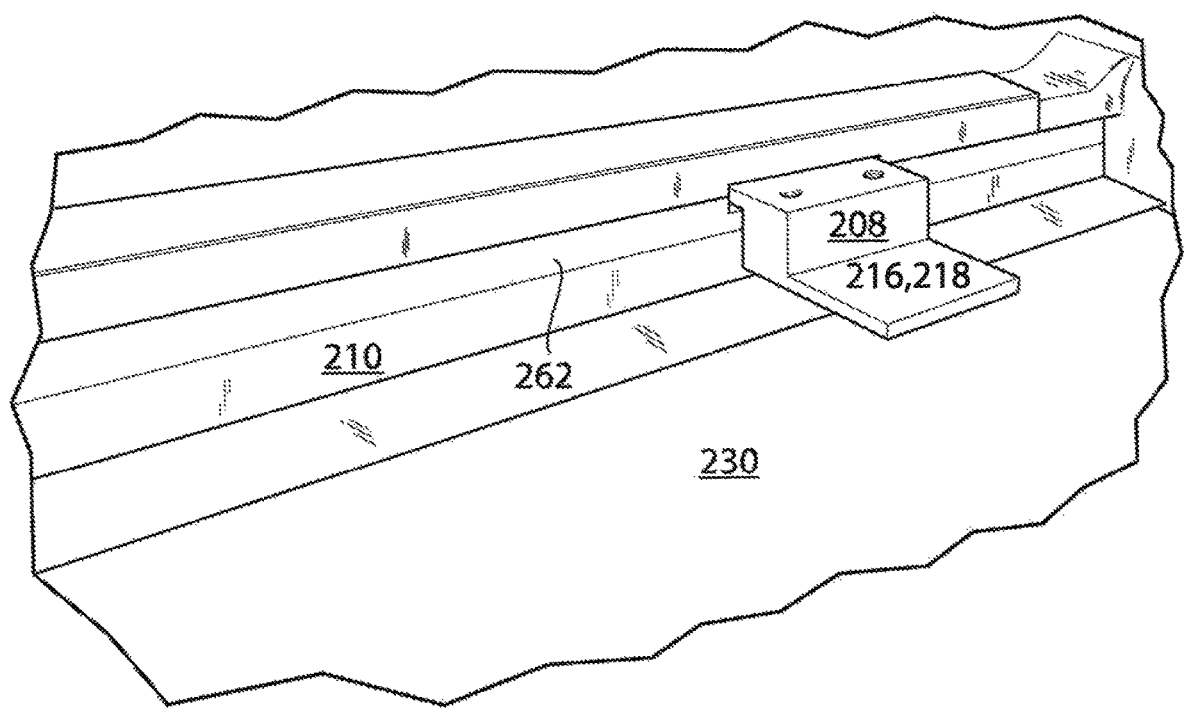

Referring to FIGS. 20-22, frame member 210 includes one or more cutouts 260 or elongated grooves 262 that are shaped to slideably receive a respective portion 216, 218 of the respective mount assemblies, such as mount assembly 208. The slidable association between a respective mount assembly 208 and respective cutout 260 and/or channel 262 provides an overlapping interface between a respective mount assembly 200, 202, 204, 206, 208 relative to door frame 210 so as to prevent inward or outward lateral deflection or displacement of a respective panel 230 associated with door frame 210 during a projectile impact event in a first direction or a projectile penetration event in the opposite direction.

It is further appreciated that panel 230 may be shaped to interfere with less than the entire perimeter associated with the opening defined by door frame 210. When provided in such a configuration, one or more of mount assemblies 200, 202, 204, 206, 208 can be secured to one of panel 230 or frame member 210 so as to accommodate a slidable bypass arrangement between discrete panels that collectively define the periphery of the opening defined by door frame 210. Said another way, such a configuration allows the window assembly defined by panel 230 to remain operable so as to provide ventilation to the interior of an automotive cavity when the respective portions of panel 230 are moved to an orientation wherein the discrete portions of the panel generally overlie one another.

FIGS. 23-35 show various views of various mount assemblies 400, 402, 404 according to another alternate embodiment of the invention. Unlike discrete mount assemblies 200, 202, 204, 206, 208, each of mount assemblies 400, 402, 404 includes a one-piece rigid body 406, 408, 410 that is constructed to receive and support a treated glass panel and cooperate with the framing of an underlying support structure. Referring to FIGS. 23 and 26-27, body 406 includes a first channel 412 and a second channel 414 that each extend along a longitudinal length of body 406. A bumper 415 is constructed to cooperate with one or more fasteners 416, 418, 420 and is configured to be disposed within channel 412. Manipulation of fasteners 416, 418, 420 relative to body 406 via one or more threaded passages 422 provides lateral translation of bumper 415 relative to channel 412 such that operation of fasteners 416, 418, 420 allows bumper 415 to be compressed against a treated glass panel disposed in channel 412.

Channel 414 defines a rib 424 that is constructed to cooperate with a support frame structure such as cutout 260 or channel 262 of a support structure as shown in FIG. 21. Referring to FIGS. 24 and 28-29, like mount body 406, mount body 408 includes a first channel 428 and the second channel 430 that extend along the longitudinal length thereof. A bumper 432 cooperates with one or more fasteners 434 and is constructed to be compressed against a treated glass panel disposed in channel 428. Unlike body 406, channel 428 of body 408 extends in a somewhat crossing direction relative to the longitudinal axis thereof and is oriented at a crossing direction relative to channel 430. Such a consideration allows the crossing orientation of the longitudinal axis associated with channel 428 relative to channel 430 so as to accommodate crossing longitudinal axes orientations between the treated glass panel associated with channel 428 and the cooperation of rib 438 of body 408 with a corresponding support structure.

Referring to FIGS. 25 and 30-31, unlike mount bodies 406, 408, mount body 410 includes an elongate channel 440 that is constructed to receive a treated glass panel and is shaped to be snugly engaged therewith. A rib 442 extends from a generally downward extending portion of body 410 and is constructed to cooperate with a slot such as cutout 260 of channel 262 as shown in FIG. 21 and associated with an underlying support structure, such as a vehicle door. The longitudinal axis of channel 440 is generally parallel to the longitudinal axis associated with rib 442.

When oriented with respect to a vehicle frame, a respective configuration and construction of mount bodies 406, 408, 410 allows placement of the treated glass panel relative thereto such that subsequent tightening of respective fasteners 416, 418, 420, 434 provides a secure and robust attachment of the treated glass panel relative to the underlying vehicle frame body. Further, the selective operability associated with mount bodies 406, 408 allows convenient replacement of a used, spent, or otherwise utilized or perforated or impacted unidirectional penetration resistant glass panel as disclosed above.

Although various exemplary dimensions are provided with respect to FIGS. 26-31 with respect to each of mount bodies 400, 402, 404 is appreciated that the various configurations and/or dimensions provided therein, and the longitudinally aligned or crossing orientation of the longitudinal axis associated with the respective channels and ribs of respective bodies 406, 408, 410 are generally specific to exemplary vehicles or vehicle types. Although it is appreciated that one or more of mount bodies 400, 402, 404 may be usable across various vehicle and/or manufacturer platforms and/or across various manufacturing years relative to discrete vehicle configurations, it is further appreciated that mount bodies 400, 402, 404 may be provided in alternate configurations to maintain the desired operability associated with the treated glass panel relative to the underlying vehicle and/or changes between model years and/or vehicle types between discrete manufacturers and/or between discrete manufacturer model years.

Similarly, referring to FIGS. 23, 24, and 32-35, it is further appreciated that the configuration and/or shape of bumpers 415, 432 associated with respective mount bodies 400, 402 can be provided in various configurations. Comparatively, referring to FIGS. 32 and 34, it should be appreciated that bumper 414 has a substantially rectilinear cross sectional shape whereas bumper 432 has only a generally rectilinear shape wherein alternate longitudinal edges 460, 462 associated with bumper 432 are provided with dissimilar thicknesses. Such a consideration accommodates the relative orientation of the treated glass panel associated with respective bumper 432 relative to the underlying mount body 402 and allows the respective mount body, discrete treated glass panel and respective bumper to correspond to the construction associated with the discrete location of the respective underlying frame assembly associated with an underlying vehicle as disclosed above. It is further appreciated that each of bumpers 415, 430 can be constructed of a pliable or somewhat elastic but robust material and/or have a laminate construction that is configured to prevent passage or over compression of discrete fasteners 416, 418, 420, 434 relative to the respective mount body and to provide generally uniform compression of respective bumper 415, 432 relative to the underlying treated glass panel when assembled. Mount assemblies 400, 402, 404 are constructed to be disposed about the circumference of the treated glass panel in a spaced manner but in a manner to provides a robust and secure support arrangement for the surface area defined by the treated glass panel.

Each of the various assemblies disclosed above provide unidirectional penetration resistance associated with what is customarily understood as a window assembly associated with an automobile. It is further appreciated that the operable door assembly associated with such vehicles customarily has less penetration resistance performance as compared to the transparent unidirectional penetration resistant panels such as panel 230 described above. Understandably, such structures commonly are not required or even desired to be transparent. Accordingly, there is a further need for a penetration resistant panel assembly configured to cooperate with the remainder of the underlying vehicle or those portions of the vehicle which are not customarily transparent to improve the penetration resistant performance thereof. FIGS. 36-45 disclose a panel and a system for improving the penetration resistant performance of support assemblies where transparency associated with the resultant assembly is not of particular concern.

Figure 36:
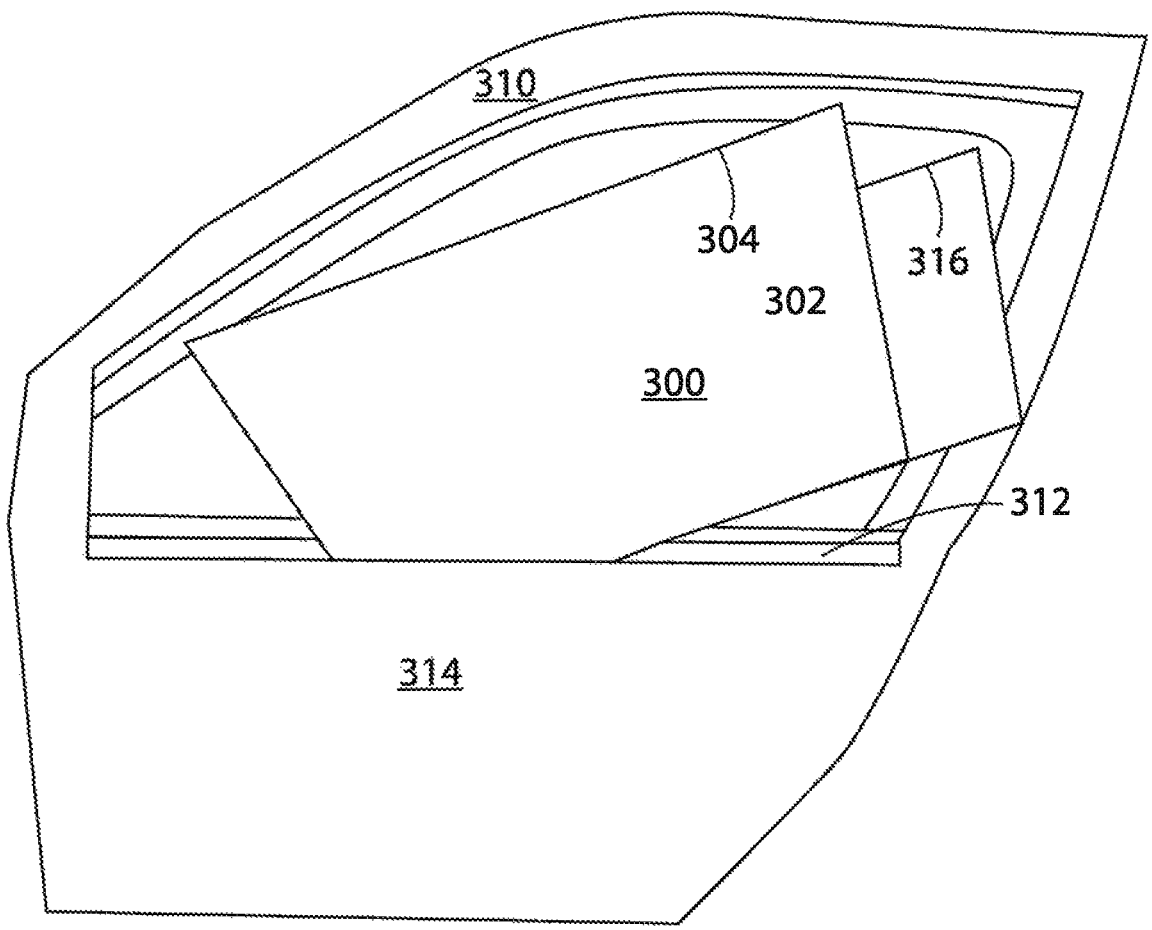
FIGS. 36-45 show various views of an opaque bidirectional penetration resistant panel that can be associated with a support structure such as a door panel of an automobile according to a further aspect of the invention.
Figure 37:
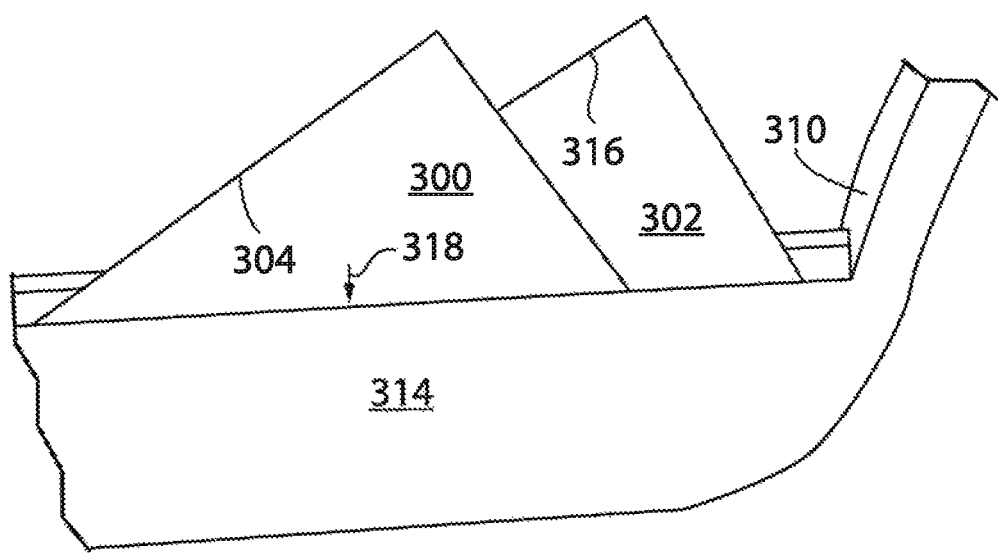

Referring to FIGS. 36 and 37, another aspect of the present invention is directed to a bidirectional penetration resistant panel 300 that is slightly deflectable but constructed to resist high impact energy projectile penetration in either direction at directions normal to a plane defined by the panel and at directions that are pitched relative to the normal direction. Panel 300 is constructed of a relatively lightweight material and constructed to be workable with customary woodworking and metalworking tools such as circular saws, reciprocating saws, drills, shears, hand tools, and the like. Panel 300 is constructed to withstand projectile penetrations in a manner wherein the remainder of the frame structure associated with supporting the penetration resistant panel is commonly robust enough to withstand and maintain an operative condition when so equipped. As disclosed further below, panel 300 is constructed to mitigate separation or degradation of the panel 300 in response to high energy projectile impacts and regardless of the direction or angle of incidence associated with the impact.

Panel 300 is defined by body 302 that is generally defined by a perimeter 304 and a thickness that is generally defined by dimension 306. Body 302 of panel 300 has a laminate construction and is formed of a plurality of layers of a nylon fabric material and adhesive disposed between adjacent layers of the fabric material. When subjected to desired pressures and temperatures and allowed to cure, body 302 of panel 300 is generally penetration resistant in crossing directions relative to the plane defined by body 302. Preferably, body 302 includes no fewer than 50 layers of nylon fabric material and a pressure sensitive adhesive subjected to pressures of approximately 10,000 to 28,000 pounds per square inch (psi), and preferably 20,000 to 28,000 pounds per square inch (psi) and temperatures of no greater than approximately 240 degrees Fahrenheit, and more preferably in the range of 200 to 220 degrees Fahrenheit during the formation process. Preferably, the fabric and adhesive laminate assembly is subjected to pressures of no less than 10,000 psi and temperatures no greater than 240 Fahrenheit or less than approximately 140 degrees Fahrenheit during formation of panel 300.

It should be appreciated that thickness 306 associated with panel 300 can be manipulated so as to manipulate the impact energy panel 300 can withstand without allowing penetration thereof. Preferably, panel 300 is constructed to withstand projectile penetration energies as described by Underwriters Laboratory Class 3A impact resistance. It is further appreciated that the thickness 306 of panel 300 can be manipulated to satisfy other more demanding impact penetration resistance performance, such as Underwriters Laboratory Class 4A impact resistance requirements without substantially increasing the weight associated with panel 300.

Panel 300 is also sufficiently lightweight so as to be conveniently transportable by a wearer and is slightly deflectable so as to allow positioning of panel 300 relative to various support structures 310 such as automotive door panels, seats, trunk structures, roof, dash, leg cavity structures or the like. It is further appreciated that during formation of panel 300, mold portions can be provided so as to provide contoured panels, such as chest, back, leg, or abdomen panels that can be incorporated into garments or pockets thereof, backpacks, or other suitable structures such as helmets, shields or the like.

Referring to the embodiment shown in FIGS. 36 and 37, panel 300 is preferably constructed to slideably cooperate with channel structures of automotive features such as a window gasket 312 associated with door panel 310 such that panel 300 can be disposed between an exterior skin 314 and an interior panel associated with door panel 310 without considerable effort or unique molding of discrete vehicle specific panel configurations. The hand or power tool workability associated with panel 300 allows formation of one or more cutouts 316 such that panel 300 does not interfere with the operability of other structures such as a door latch or window assemblies one associated with door panel 310. As shown in FIGS. 36 and 37, panel 300 can be translated in a generally downward direction, indicated by arrow 318 relative to door panel 310 such that panel 300 can be disposed between exterior door skin 314 and an interior skin 320 associated therewith.

Referring to FIGS. 36-43, when associated with door panel 310, a lower edge 320 of panel 300 is constructed to be disposed between a laterally extending crossbar 322 associated with door panel 310 and an interior facing surface 324 associated with door skin 314. It is further appreciated that panel 300 can be provided in a multiple portion configuration wherein the opposing portions are configured to cooperate with and/or accommodate the interior structures of door panel 310.

Figure 38:
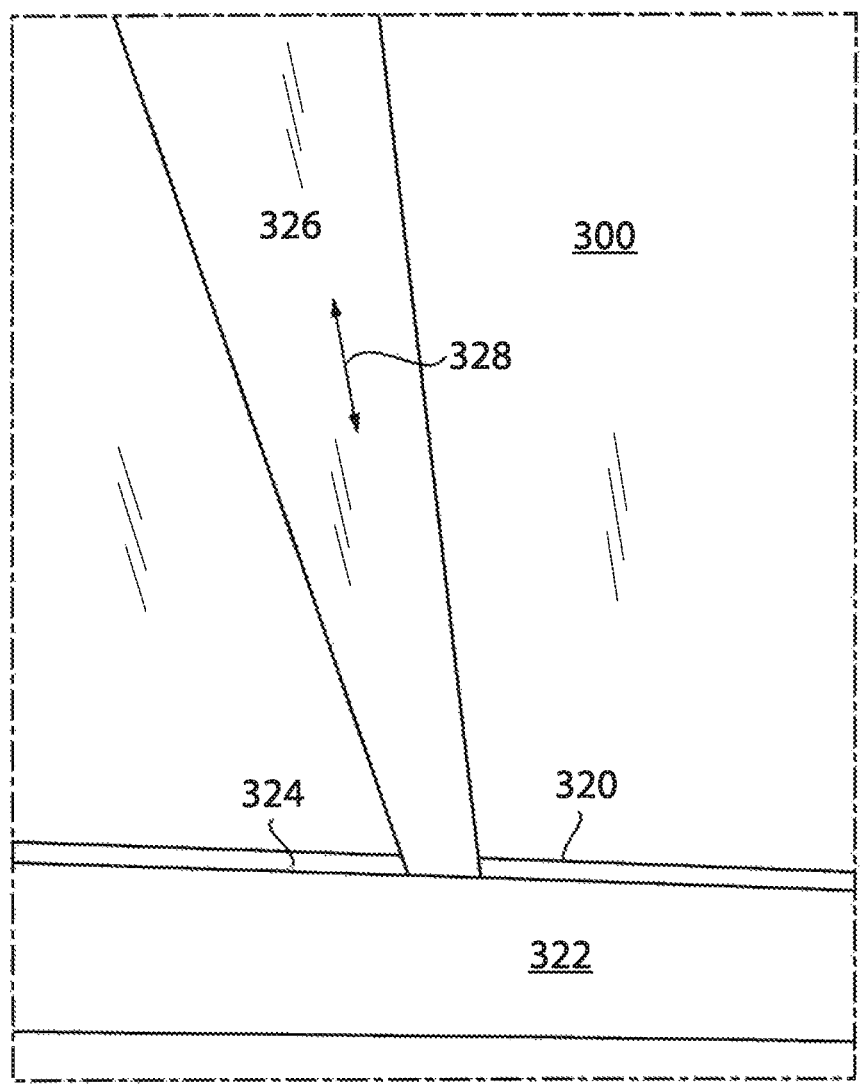
Figure 39:
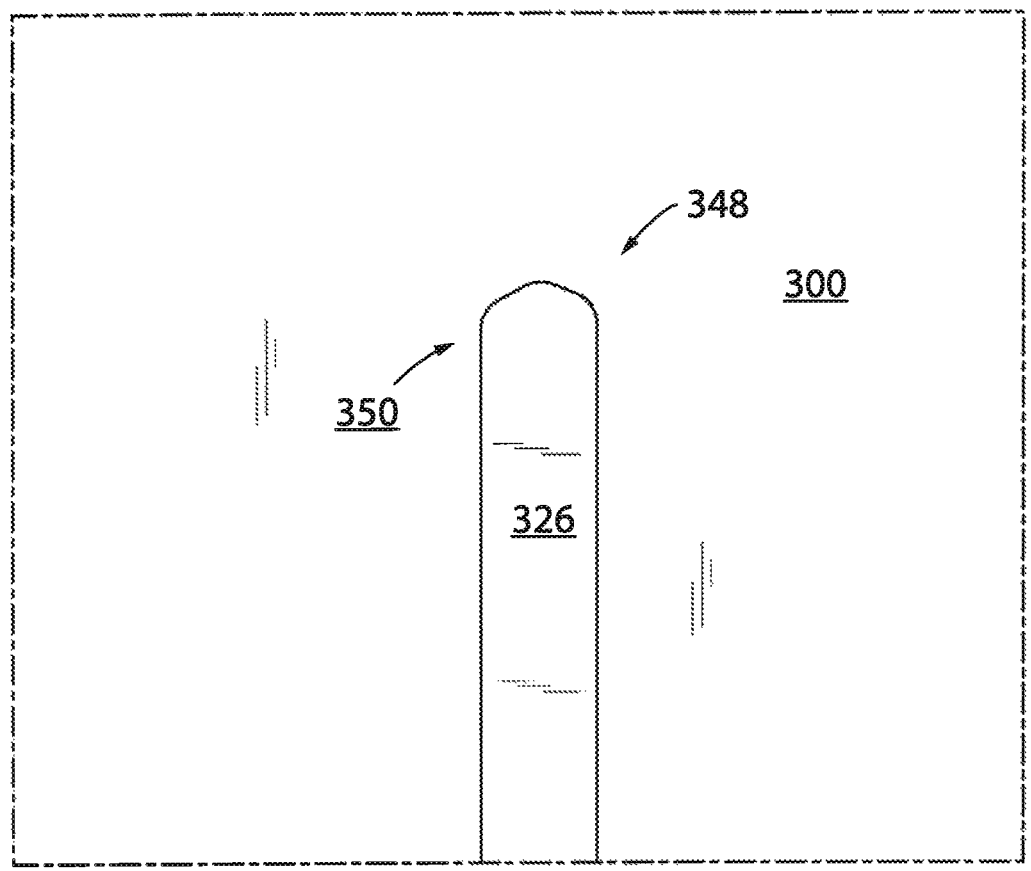

A support bracket 326 extends in a generally vertical direction, indicated by arrow 328, relative to door panel 310. Support bracket 326 extends between a lower lateral rail 330 defined by door panel 310 and an upper lateral frame rail 332 defined by doorframe 310. Referring to FIGS. 38-39, a lower end 340 of support bracket 326 has a generally rectilinear shape 342 that is configured to cooperate with lower frame rail 322 of doorframe 310. The rectilinear shape 342 associated with lower end 340 of support bracket 326 provides a tactile indication as to a generally vertically transverse orientation of support bracket 326 relative to door panel 310 when support bracket 326 is associated therewith.

Lower end 340 of support bracket 326 is constructed to be snugly captured between lower frame rail 322 and panel 300 so as to prevent lateral translation of panel 300 relative to doorframe 310 when panel 300 is subjected to an impact or during operation of the underlying vehicle. The vehicle outboard lateral orientation of support bracket 326 relative to crash bar 322 prevents inward lateral deflection of panel 300 relative to door panel 310 due to impacts proximate the longitudinal centerline or median portion associated with door panel 310 and locations offset therefrom.

Figure 40:
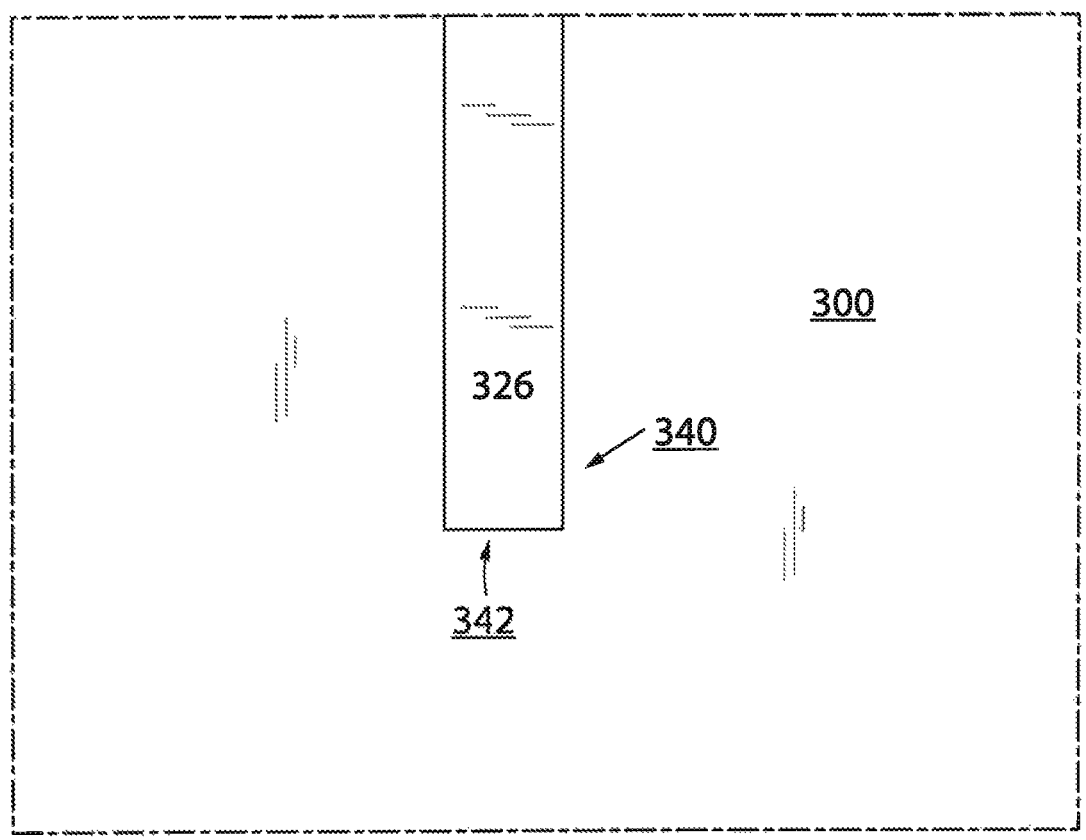
Figure 41:
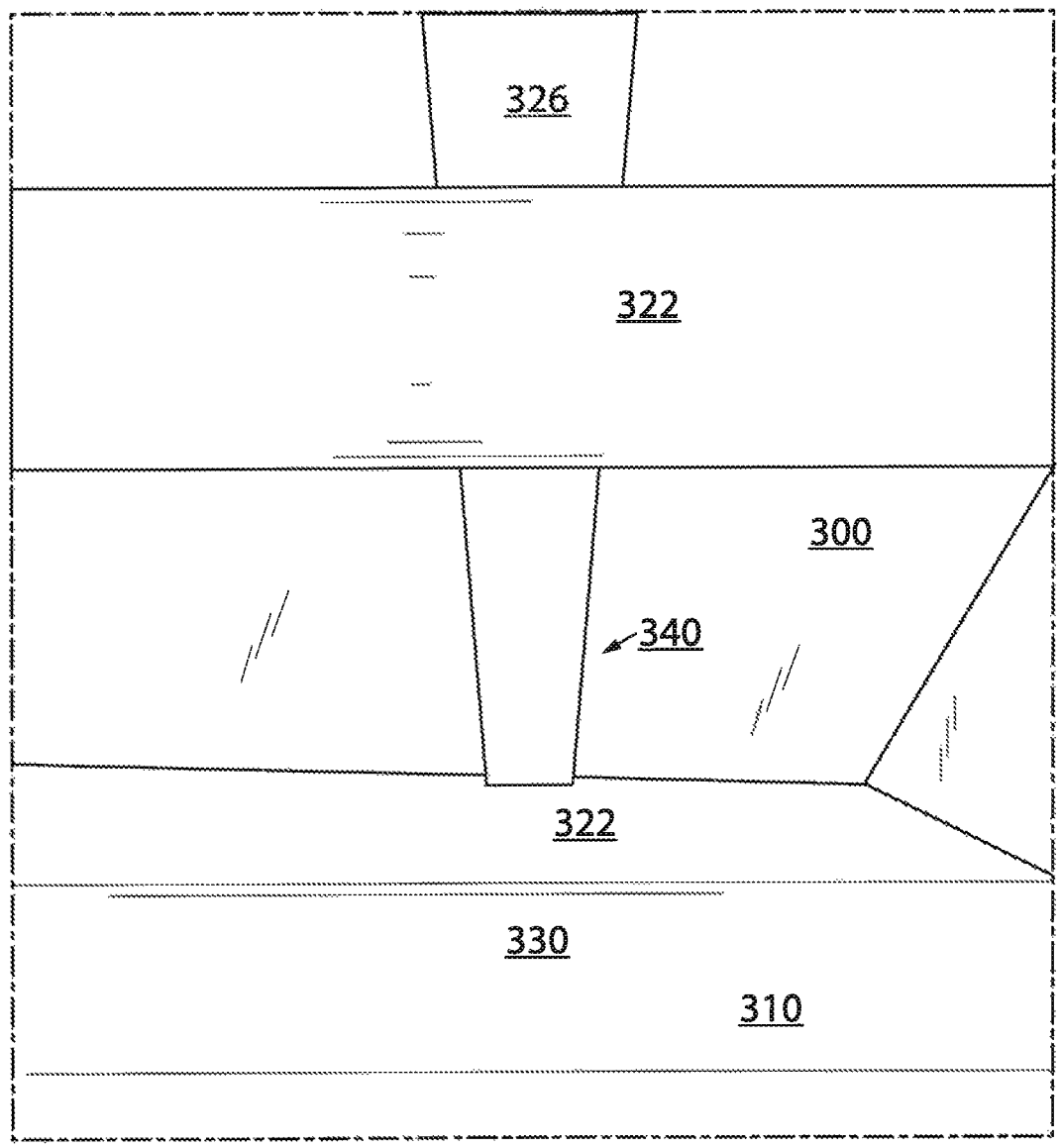
Figure 42:
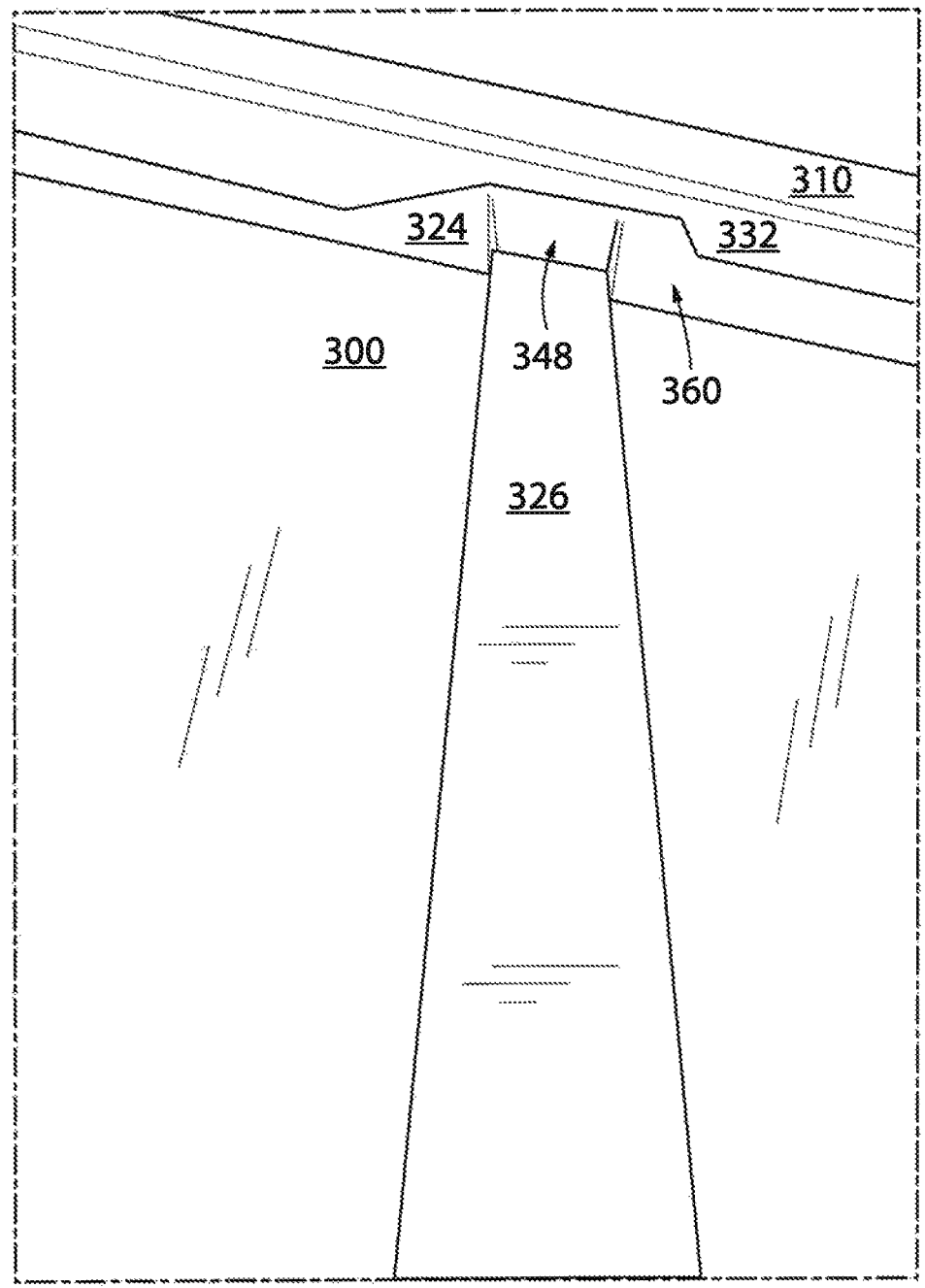
Figure 43:
Figure 44:
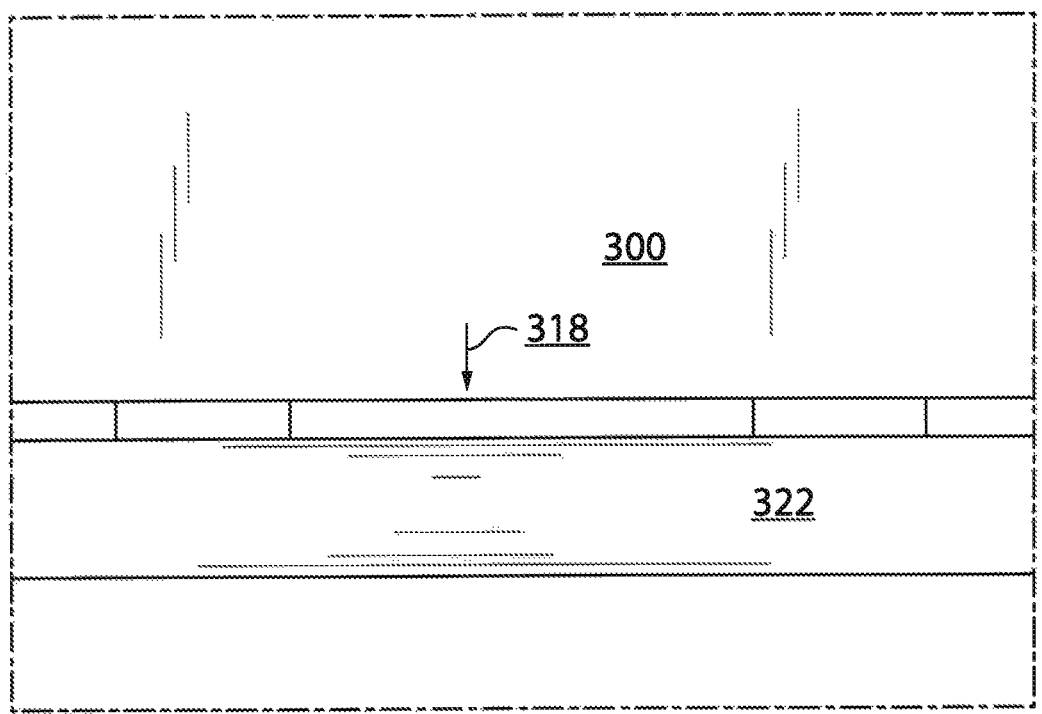
Figure 45:
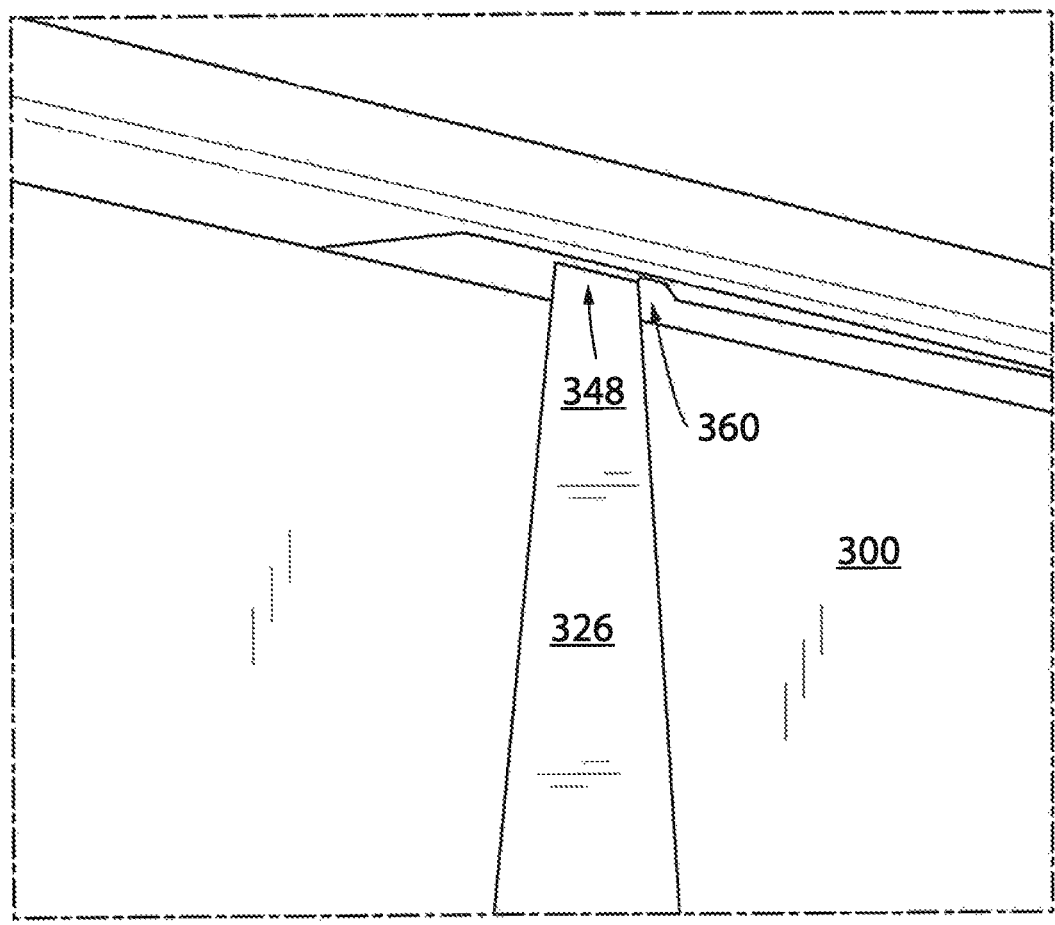

Referring to FIGS. 37, 40, and 43, an upward oriented longitudinal end 348 of support bracket 326 has a generally curvilinear shape 350 and is constructed to be captured behind an upper rail 332 associated with door panel 310. Rail 332 preferably includes a cutout 360 constructed to provide a tactile indication as to the generally vertical orientation of support bracket 326 relative to doorframe 310. Cutout 360 is preferably contoured to cooperate with end 348 of support bracket 326 so as to prevent translation of support bracket 326 when engaged therewith. Alternatively, it is appreciated that an adhesive material, such as silicone or the like, can be utilized to maintain the desired orientation of support bracket 326 relative to upper and lower frame members 322, 332 associated with door panel 310.

When engaged with door panel 310, panel 300 is generally disposed between support bracket 326 and an interior facing surface 324 of exterior door skin 310 such that support bracket 326 prevents inward lateral deflection of panel 300 when panel 300 is subjected to impacts directed in an inboard lateral direction relative to door panel 310. As compared to the transparent penetration resistant panel assemblies disclosed above, it should be appreciated that panel 300 is resistant to projectile penetrations in opposite lateral directions and directions oriented in crossing orientations relative to the generally planar orientation of panel 300. That is, it should be further appreciated that panel 300 is resistant to projectile penetrations that are directed in crossing directions relative to the planar orientation of panel 300. Panel 300, and support bracket 326 associated therewith, when associated with door panel 310 are further configured the facilitate or otherwise maintain operation of the customary structures of door panel 310 such as a door latch and handle assemblies as well as window operating systems.

As disclosed above, although disclosed above as being associated with a door panel 310, it is further appreciated that projectile penetration resistant panel 300 can be conveniently configured to cooperate with other automotive structures such as seatbacks or the like, trunk structures, other door or roof structures, dash, leg cavity structures, etc. to provide an automotive or vehicle assembly wherein the passenger compartment is generally configured to resist projectile penetrations directed into the occupant cavity. As further disclosed above, it is further appreciated that the lightweight nature and moldability associated with formation of panel 300 renders panel 300 conveniently applicable to other applications such as the formation of body armor, shields, etc. wherein penetration resistant materials are intended to be transported by a wearer or in close proximity to organic entities.

It should be understood that the above description, while indicating representative embodiments of the present invention, is given by way of illustration and not of limitation. Many changes and modifications may be made within the scope of the present invention without departing from the spirit thereof, and the invention includes all such modifications. Various additions, modifications, and rearrangements are contemplated as being within the scope of the following claims, which particularly point out and distinctly claim the subject matter regarding as the invention, and it is intended that the following claims cover all such additions, modifications, and rearrangements.

I claim:

1. A glass treatment assembly that provides unidirectional projectile penetration of an underlying pane of glass, the glass treatment assembly comprising:
    a blowback sheet applied to a first side of a glass layer, the blowback sheet consisting of a multi-ply film, the first side of the glass layer being untreated;
    a binder coat applied to a second side of the glass layer that is opposite the first side, the binder coat being an adhesive layer, the second side of the glass layer being untreated;
    a resistant layer applied to the binder coat; and
    a top coat applied to the resistant layer, the top coat being a scratch resistant coat, such that the blowback sheet, the glass layer, the binder coat, the resistant layer, and the top coat form a transparent assembly in an ordered arrangement, wherein the blowback sheet and the top coat are outermost layers on opposing sides of the assembly in the ordered arrangement, and wherein configuration of the assembly in the ordered arrangement prevents penetration of projectiles through the assembly in a first direction and allows penetration of projectiles through the assembly in a second direction that is axially aligned with and opposite to the first direction,
    wherein the multi-ply film is triple-ply polyethylene terephthalate (PET) film.

2. The glass treatment assembly of claim 1 further comprising a gasket that includes a plurality of walls that extend upwardly from a bottom wall such that the plurality of walls and the bottom wall define at least one slot disposed between adjacent walls of the plurality of walls and wherein at least one layer of glass fitted with the glass treatment assembly can be disposed within a respective one of the at least one slot.

3. The glass treatment assembly of claim 2 wherein the at least one layer of glass further defines a window and wherein the gasket comprises a plurality of slots that are each configured to slideably receive a respective window fitted with a respective glass treatment assembly.

4. The glass treatment assembly of claim 3 further comprising a gap disposed between adjacent layers of glass associated with the respective window.

5. The glass treatment assembly of claim 3 further comprising an insulating gas disposed within the gap.

6. The glass treatment assembly of claim 5 wherein the insulating gas comprises argon.

7. The glass treatment assembly of claim 2 wherein the gasket surrounds a perimeter of the glass layer.

8. The glass treatment assembly of claim 1 wherein the binder coat is a pressure sensitive adhesive layer.

9. The glass treatment assembly of claim 1 wherein the blowback sheet applied to the first side of the glass layer is the only blowback sheet applied to the assembly.

10. An automotive window treatment kit that provides unidirectional penetration resistance to treated windows, the treatment kit comprising:
    a glass treatment assembly comprising:
        a blowback sheet configured to be applied to the first side of a window, the blowback sheet consisting of a multi-ply film, the first side of the window being untreated;
        a binder coat configured to be applied to a second side of the window, the binder coat being an adhesive layer, the second side of the window being untreated;
        a resistant layer applied to the binder coat; and
        a top coat applied to the resistant layer, the top coat being a scratch resistant coat, wherein the blowback sheet, the window, the binder coat, the resistant layer, and the top coat form a transparent assembly in an ordered arrangement, wherein the blowback sheet and the top coat are outermost layers on opposing sides of the assembly in the ordered arrangement, and wherein configuration of the assembly in the ordered arrangement prevents penetration of projectiles through the assembly in a first direction and allows penetration of projectiles through the assembly in a second direction that is axially aligned with and opposite to the first direction,
    wherein the multi-ply film is triple-ply PET film;
    a gasket assembly comprising:
        a gasket member that defines at least one slot configured to extend about at least a portion of a perimeter of the window; and
    a mount bracket assembly that is configured to mount a supplemental window adjacent at least one window of the car, the bracket assembly comprising:
        a main body having a first end and a second end;
        a first arm extending outwardly from a first surface of the main body at the first end of the main body;
        a second arm extending outwardly from the first surface of the main body at the second end of the main body;
        a receiving slot disposed between the first arm and the second arm, the receiving slot configured to receive the supplemental window; and
        a third arm extending outwardly from a second surface of the main body at the second end of the main body.

11. The treatment kit of claim 10 wherein the mount bracket assembly is further constructed to maintain a gap between adjacent windows.

12. The treatment kit of claim 11 further comprising an insulating gas disposed within the gap.

13. The treatment kit of claim 10 wherein the bracket assembly further comprises a fourth arm that extends upwardly from an end of the third arm and is configured to be mechanically secured to an underlying respective automobile.

14. The treatment kit of claim 13 wherein the fourth arm is oriented generally parallel to at least one of the first arm and the second arm.

15. A method of providing unidirectional projectile penetration resistance to glass, the method comprising:
    applying a blowback layer to a first side of a generally planar glass surface, the blowback layer consisting of a multi-ply film, the first side of the generally planar glass surface being untreated;
    applying a binder coat layer to a second side of the generally planar glass surface, the binder coat layer being an adhesive layer, the second side of the generally planar glass surface being untreated;
applying a resistance layer to the binder coat layer such that the binder coat layer is disposed between the resistance layer and the generally planar glass surface; and
applying a top coat layer to the resistance layer, the top coat layer being a scratch resistant coat, such that the resistance layer is disposed between the binder coat layer and the top coat layer and such that the blowback layer, the generally planar glass surface, the binder coat layer, the resistance layer, and the top coat layer form a transparent assembly configured in an ordered arrangement, wherein the blowback sheet layer and the top coat layer are outermost layers on opposing sides of the assembly in the ordered arrangement, and wherein configuration of the assembly in the ordered arrangement prevents penetration of projectiles through the assembly in a first direction from the top coat layer toward the blowback sheet-layer and allows penetration of projectiles through the assembly in a second direction that is axially aligned with and opposite to the first direction,
wherein the multi-ply film is triple-ply PET film.

16. The method of claim 15 further comprising applying the blowback layer to the first side of the generally planar glass surface such that the first side faces in a direction generally opposite the first direction when the generally planar glass surface is associated with a support structure.

17. The method of claim 15 further comprising disposing a gasket about a perimeter of a pair of adjacent treated glass surfaces such that a space is maintained between the adjacent glass surfaces.

18. The method of claim 17 further comprising orienting the adjacent treated glass surfaces at crossing angles that are near parallel relative to one another.

19. The method of claim 17 further comprising filing the space with a gas.

20. The method of claim 17 further comprising providing a plurality of mounting brackets that are each configured to cooperate with the adjacent treated glass surfaces and secure the adjacent treated glass surfaces relative to an underlying structure of a vehicle.

* * * * *